(12) United States Patent
Anvaripour et al.

(10) Patent No.: US 11,831,592 B2
(45) Date of Patent: Nov. 28, 2023

(54) COMBINING INDIVIDUAL FUNCTIONS INTO SHORTCUTS WITHIN A MESSAGING SYSTEM

(71) Applicant: Snap Inc., Santa Monica, CA (US)

(72) Inventors: Kaveh Anvaripour, Santa Monica, CA (US); Laurent Desserrey, Los Angeles, CA (US)

(73) Assignee: SNAP INC., Santa Monica, CA (US)

( * ) Notice: Subject to any disclaimer, the term of this patent is extended or adjusted under 35 U.S.C. 154(b) by 0 days.

(21) Appl. No.: 17/745,554

(22) Filed: May 16, 2022

(65) Prior Publication Data

US 2022/0377033 A1 Nov. 24, 2022

Related U.S. Application Data

(60) Provisional application No. 63/190,600, filed on May 19, 2021.

(51) Int. Cl.
*G06F 15/16* (2006.01)
*H04L 51/08* (2022.01)
(Continued)

(52) U.S. Cl.
CPC ............. *H04L 51/08* (2013.01); *G06T 19/006* (2013.01); *H04L 51/10* (2013.01); *H04L 51/21* (2022.05)

(58) Field of Classification Search
CPC ......... H05L 51/08; H05L 51/21; H05L 51/10; G06T 19/006; H04L 51/08; H04L 51/21; H04L 51/10
(Continued)

(56) References Cited

U.S. PATENT DOCUMENTS

| 6,680,749 B1 * | 1/2004 | Anderson | H04N 23/633 |
| | | | 348/E5.042 |
| 8,676,273 B1 * | 3/2014 | Fujisaki | H04M 1/724 |
| | | | 455/418 |

(Continued)

FOREIGN PATENT DOCUMENTS

| CN | 108174099 | 6/2018 |
| WO | 2019236217 | 12/2019 |

(Continued)

OTHER PUBLICATIONS

"International Application Serial No. PCT/US2022/029458, International Search Report dated Sep. 8, 2022", 6 pgs.

(Continued)

*Primary Examiner* — Moustafa M Meky
(74) *Attorney, Agent, or Firm* — SCHWEGMAN LUNDBERG & WOESSNER, P.A.

(57) ABSTRACT

Aspects of the present disclosure involve a system comprising a computer-readable storage medium storing a program and method for combining individual functions into shortcuts. The program and method provide for accessing information for a shortcut for performing with respect to an image captured by a device camera, the shortcut corresponding to a combination of individual functions to apply to the image; causing, based on the accessing, display of an interface with a user-selectable element for performing the shortcut with respect to the image; receiving, via the interface, user selection of the user-selectable element; and applying, in response to the receiving, the combination of the individual functions to the image.

15 Claims, 14 Drawing Sheets

(51) Int. Cl.
*H04L 51/21* (2022.01)
*G06T 19/00* (2011.01)
*H04L 51/10* (2022.01)

(58) Field of Classification Search
USPC .......................................................... 709/200
See application file for complete search history.

(56) References Cited

U.S. PATENT DOCUMENTS

| | | | |
|---|---|---|---|
| 2007/0172140 A1 | 7/2007 | Kokemohr | |
| 2013/0329995 A1 | 12/2013 | Webb et al. | |
| 2014/0101588 A1* | 4/2014 | Chang | G06F 3/04817 |
| | | | 715/810 |
| 2016/0006927 A1 | 1/2016 | Sehn | |
| 2017/0192798 A1 | 7/2017 | Jones et al. | |
| 2018/0152622 A1* | 5/2018 | Wang | H04N 23/63 |
| 2019/0236786 A1 | 8/2019 | Mcnerney et al. | |
| 2019/0238759 A1 | 8/2019 | Ahn et al. | |
| 2019/0342240 A1 | 11/2019 | Garrido et al. | |
| 2020/0137296 A1* | 4/2020 | Okada | H04N 23/667 |
| 2020/0344411 A1 | 10/2020 | Cragg et al. | |
| 2021/0037195 A1 | 2/2021 | Cutler et al. | |
| 2021/0349605 A1 | 11/2021 | Nonaka et al. | |
| 2021/0366001 A1* | 11/2021 | Jacobs | H04W 4/02 |
| 2022/0301351 A1 | 9/2022 | Zhao et al. | |
| 2022/0375137 A1 | 11/2022 | Anvaripour et al. | |
| 2023/0102237 A1* | 3/2023 | Jung | G06F 3/0482 |
| | | | 455/575.4 |

FOREIGN PATENT DOCUMENTS

| | | |
|---|---|---|
| WO | 2021073315 | 4/2021 |
| WO | WO-2022245738 A1 | 11/2022 |
| WO | WO-2022245747 A1 | 11/2022 |

OTHER PUBLICATIONS

"International Application Serial No. PCT/US2022/029458, Written Opinion dated Sep. 8, 2022", 13 pgs.

"International Application Serial No. PCT/US2022/029479, International Search Report dated Sep. 8, 2022", 5 pgs.

"International Application Serial No. PCT/US2022/029479, Written Opinion dated Sep. 8, 2022", 12 pgs.

Jacinta, "A Guide to Instagram Reels—feedalpha: Social Media Automation a Guide to Instagram Reels", [Online] Retrieved from the Internet: <URL: https://feedalpha.com/a-guide-to-instagram-reels/>, [retrieved on Mar. 26, 2022], (Oct. 20, 2020), 12 pgs.

Nacis, Johnny, "Snapchat : How to use Timeline 2020", [Online]. Retrieved from the Internet: <URL:https://www.youtube.com/watch?v=vpd_fhM_OTg> (Dec. 13, 2020), 4 pgs.

Redmon, Joseph, "You only look once: Unified, real-time object detection", CVPR, 2016, [Online]. Retrieved from the Internet: <URL: URL:https://arxiv.org/pdf/1506.02640>, (May 9, 2016), 10 pgs.

Wynne, Mabel, "How to edit a video on TikTok", [Online] Retrieved from the Internet: <URL: https://www.creativeblog.com/how-to/edit-video-on-tiktok>, [retrieved on Mar. 27, 2022], (Nov. 4, 2020), 8 pgs.

"U.S. Appl. No. 17/745,659, Non Final Office Action dated Jun. 20, 2023", 14 pgs.

"English Translation of CN 108174099 A", (Jun. 13, 2023), 12 pgs.

* cited by examiner

COMBINING INDIVIDUAL FUNCTIONS INTO SHORTCUTS WITHIN A MESSAGING SYSTEM

CROSS-REFERENCE TO RELATED APPLICATION

This patent application claims the benefit of U.S. Provisional Patent Application No. 63/190,619, filed May 19, 2021, entitled "COMBINING INDIVIDUAL FUNCTIONS INTO SHORTCUTS WITHIN A MESSAGING SYSTEM", which is incorporated by reference herein in its entirety.

TECHNICAL FIELD

The present disclosure relates generally to a messaging system, including combining individual functions into shortcuts within a messaging system.

BACKGROUND

Messaging systems provide for the exchange of message content between users. For example, a messaging system allows a user to exchange message content (e.g., text, images) with one or more other users.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some nonlimiting examples are illustrated in the figures of the accompanying drawings in which.

DETAILED DESCRIPTION

A messaging system typically allow users to exchange content items (e.g., messages, images and/or video) with one another in a message thread. A messaging system may implement various functions for modifying or otherwise supplementing image data captured by a device camera, for including in a message. Examples of such functions include applying augmented reality content to the image data, selecting an audio track to accompany the image data, and enabling different camera modes (e.g., a timer mode, a slow motion mode, and the like) for image capture.

The disclosed embodiments provide a messaging system with shortcuts, where each shortcut corresponds to applying a combination of individual functions with respect to captured image data. A shortcut allows the end user, via a single gesture (e.g., a tap or press), to apply the combination of individual functions to the image data. An icon to activate a shortcut may be displayed within different user interfaces of the messaging application, including a camera center interface (which displays all available shortcuts), a scan results interface (which displays shortcuts related to detected object via a scan operation), and an interface displaying a media content item (where the associated shortcut is represented by an icon).

By virtue of generating, maintaining and storing shortcuts for combining individual functions, it is possible to reduce the amount of user input typically required for performing the individual functions. In addition, the corresponding user interfaces with shortcuts provide for an engaging user experience.

Figure 1:
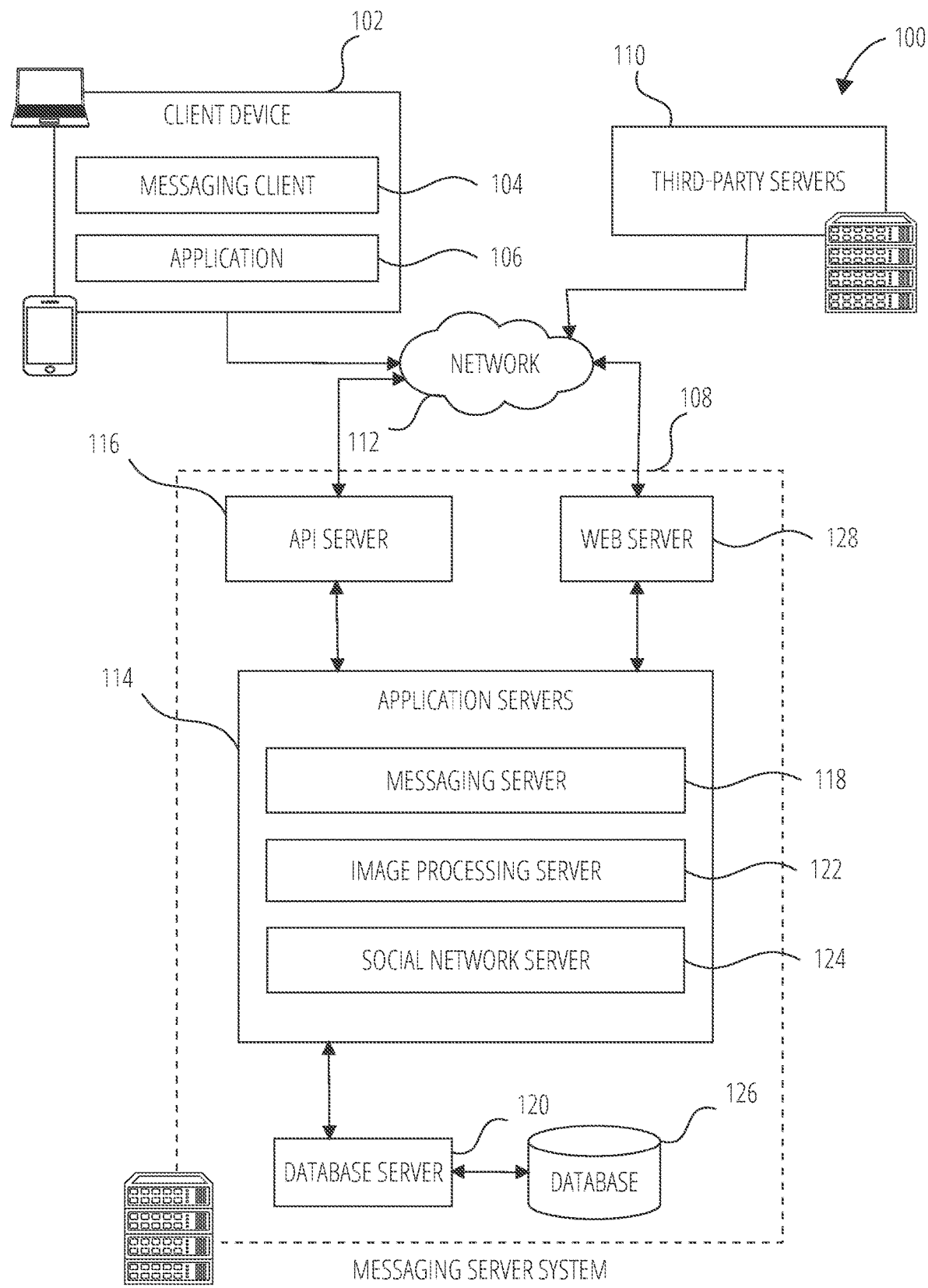
FIG. 1 is a diagrammatic representation of a networked environment in which the present disclosure may be deployed, in accordance with some examples.

FIG. 1 is a block diagram showing an example messaging system 100 for exchanging data (e.g., messages and associated content) over a network. The messaging system 100 includes multiple instances of a client device 102, each of which hosts a number of applications, including a messaging client 104 and other applications 106. Each messaging client 104 is communicatively coupled to other instances of the messaging client 104 (e.g., hosted on respective other client devices 102), a messaging server system 108 and third-party servers 110 via a network 112 (e.g., the Internet). A messaging client 104 can also communicate with locally-hosted applications 106 using Applications Program Interfaces (APIs).

A messaging client 104 is able to communicate and exchange data with other messaging clients 104 and with the messaging server system 108 via the network 112. The data exchanged between messaging clients 104, and between a messaging client 104 and the messaging server system 108, includes functions (e.g., commands to invoke functions) as well as payload data (e.g., text, audio, video or other multimedia data).

The messaging server system 108 provides server-side functionality via the network 112 to a particular messaging client 104. While certain functions of the messaging system 100 are described herein as being performed by either a messaging client 104 or by the messaging server system 108, the location of certain functionality either within the messaging client 104 or the messaging server system 108 may be a design choice. For example, it may be technically preferable to initially deploy certain technology and functionality within the messaging server system 108 but to later migrate this technology and functionality to the messaging client 104 where a client device 102 has sufficient processing capacity.

The messaging server system 108 supports various services and operations that are provided to the messaging client 104. Such operations include transmitting data to, receiving data from, and processing data generated by the messaging client 104. This data may include message content, client device information, geolocation information, media augmentation and overlays, message content persistence conditions, social network information, and live event information, as examples. Data exchanges within the messaging system 100 are invoked and controlled through functions available via user interfaces (UIs) of the messaging client 104.

Turning now specifically to the messaging server system 108, an Application Program Interface (API) server 116 is coupled to, and provides a programmatic interface to, application servers 114. The application servers 114 are communicatively coupled to a database server 120, which facilitates access to a database 126 that stores data associated with messages processed by the application servers 114. Similarly, a web server 128 is coupled to the application servers 114, and provides web-based interfaces to the application servers 114. To this end, the web server 128 processes incoming network requests over the Hypertext Transfer Protocol (HTTP) and several other related protocols.

The Application Program Interface (API) server 116 receives and transmits message data (e.g., commands and message payloads) between the client device 102 and the application servers 114. Specifically, the Application Program Interface (API) server 116 provides a set of interfaces (e.g., routines and protocols) that can be called or queried by the messaging client 104 in order to invoke functionality of the application servers 114. The Application Program Interface (API) server 116 exposes various functions supported by the application servers 114, including account registration, login functionality, the sending of messages, via the application servers 114, from a particular messaging client 104 to another messaging client 104, the sending of media files (e.g., images or video) from a messaging client 104 to a messaging server 118, and for possible access by another messaging client 104, the settings of a collection of media data (e.g., story), the retrieval of a list of friends of a user of a client device 102, the retrieval of such collections, the retrieval of messages and content, the addition and deletion of entities (e.g., friends) to an entity graph (e.g., a social graph), the location of friends within a social graph, and opening an application event (e.g., relating to the messaging client 104).

The application servers 114 host a number of server applications and subsystems, including for example a messaging server 118, an image processing server 122, and a social network server 124. The messaging server 118 implements a number of message processing technologies and functions, particularly related to the aggregation and other processing of content (e.g., textual and multimedia content) included in messages received from multiple instances of the messaging client 104. As will be described in further detail, the text and media content from multiple sources may be aggregated into collections of content (e.g., called stories or galleries). These collections are then made available to the messaging client 104. Other processor and memory intensive processing of data may also be performed server-side by the messaging server 118, in view of the hardware requirements for such processing.

The application servers 114 also include an image processing server 122 that is dedicated to performing various image processing operations, typically with respect to images or video within the payload of a message sent from or received at the messaging server 118.

Figure 3:
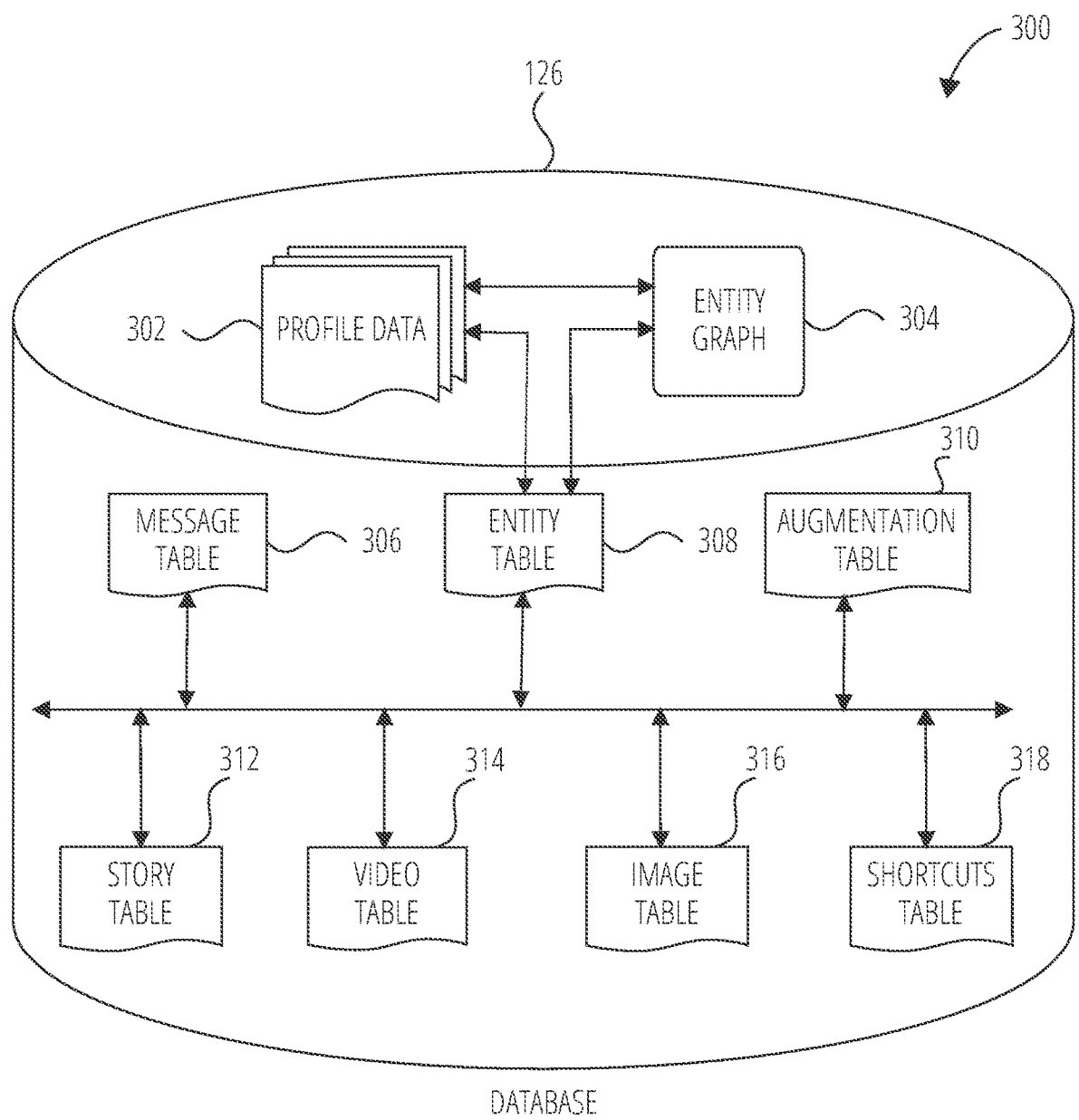
FIG. 3 is a diagrammatic representation of a data structure as maintained in a database, in accordance with some examples.

The social network server 124 supports various social networking functions and services and makes these functions and services available to the messaging server 118. To this end, the social network server 124 maintains and accesses an entity graph 304 (as shown in FIG. 3) within the database 126. Examples of functions and services supported by the social network server 124 include the identification of other users of the messaging system 100 with which a particular user has relationships or is "following," and also the identification of other entities and interests of a particular user.

Returning to the messaging client 104, features and functions of an external resource (e.g., an application 106 or applet) are made available to a user via an interface of the messaging client 104. In this context, "external" refers to the fact that the application 106 or applet is external to the messaging client 104. The external resource is often provided by a third party but may also be provided by the creator or provider of the messaging client 104. The messaging client 104 receives a user selection of an option to launch or access features of such an external resource. The external resource may be the application 106 installed on the client device 102 (e.g., a "native app"), or a small-scale version of the application (e.g., an "applet") that is hosted on the client device 102 or remote of the client device 102 (e.g., on third-party servers 110). The small-scale version of the application includes a subset of features and functions of the application (e.g., the full-scale, native version of the application) and is implemented using a markup-language document. In one example, the small-scale version of the application (e.g., an "applet") is a web-based, markup-language version of the application and is embedded in the messaging client 104. In addition to using markup-language documents (e.g., a .*ml file), an applet may incorporate a scripting language (e.g., a .*js file or a .json file) and a style sheet (e.g., a .*ss file).

In response to receiving a user selection of the option to launch or access features of the external resource, the messaging client 104 determines whether the selected external resource is a web-based external resource or a locally-installed application 106. In some cases, applications 106 that are locally installed on the client device 102 can be launched independently of and separately from the messaging client 104, such as by selecting an icon, corresponding to the application 106, on a home screen of the client device 102. Small-scale versions of such applications can be launched or accessed via the messaging client 104 and, in some examples, no or limited portions of the small-scale application can be accessed outside of the messaging client 104. The small-scale application can be launched by the messaging client 104 receiving, from a third-party server 110 for example, a markup-language document associated with the small-scale application and processing such a document.

In response to determining that the external resource is a locally-installed application 106, the messaging client 104 instructs the client device 102 to launch the external resource by executing locally-stored code corresponding to the external resource. In response to determining that the external resource is a web-based resource, the messaging client 104 communicates with the third-party servers 110 (for example) to obtain a markup-language document corresponding to the selected external resource. The messaging client 104 then processes the obtained markup-language document to present the web-based external resource within a user interface of the messaging client 104.

The messaging client 104 can notify a user of the client device 102, or other users related to such a user (e.g., "friends"), of activity taking place in one or more external resources. For example, the messaging client 104 can provide participants in a conversation (e.g., a chat session) in the messaging client 104 with notifications relating to the current or recent use of an external resource by one or more members of a group of users. One or more users can be invited to join in an active external resource or to launch a recently-used but currently inactive (in the group of friends) external resource. The external resource can provide participants in a conversation, each using respective messaging clients 104, with the ability to share an item, status, state, or location in an external resource with one or more members of a group of users into a chat session. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the messaging client 104. The external resource can selectively include different media items in the responses, based on a current context of the external resource.

The messaging client 104 can present a list of the available external resources (e.g., applications 106 or applets) to a user to launch or access a given external resource. This list can be presented in a context-sensitive menu. For example, the icons representing different ones of the application 106 (or applets) can vary based on how the menu is launched by the user (e.g., from a conversation interface or from a non-conversation interface).

Figure 2:
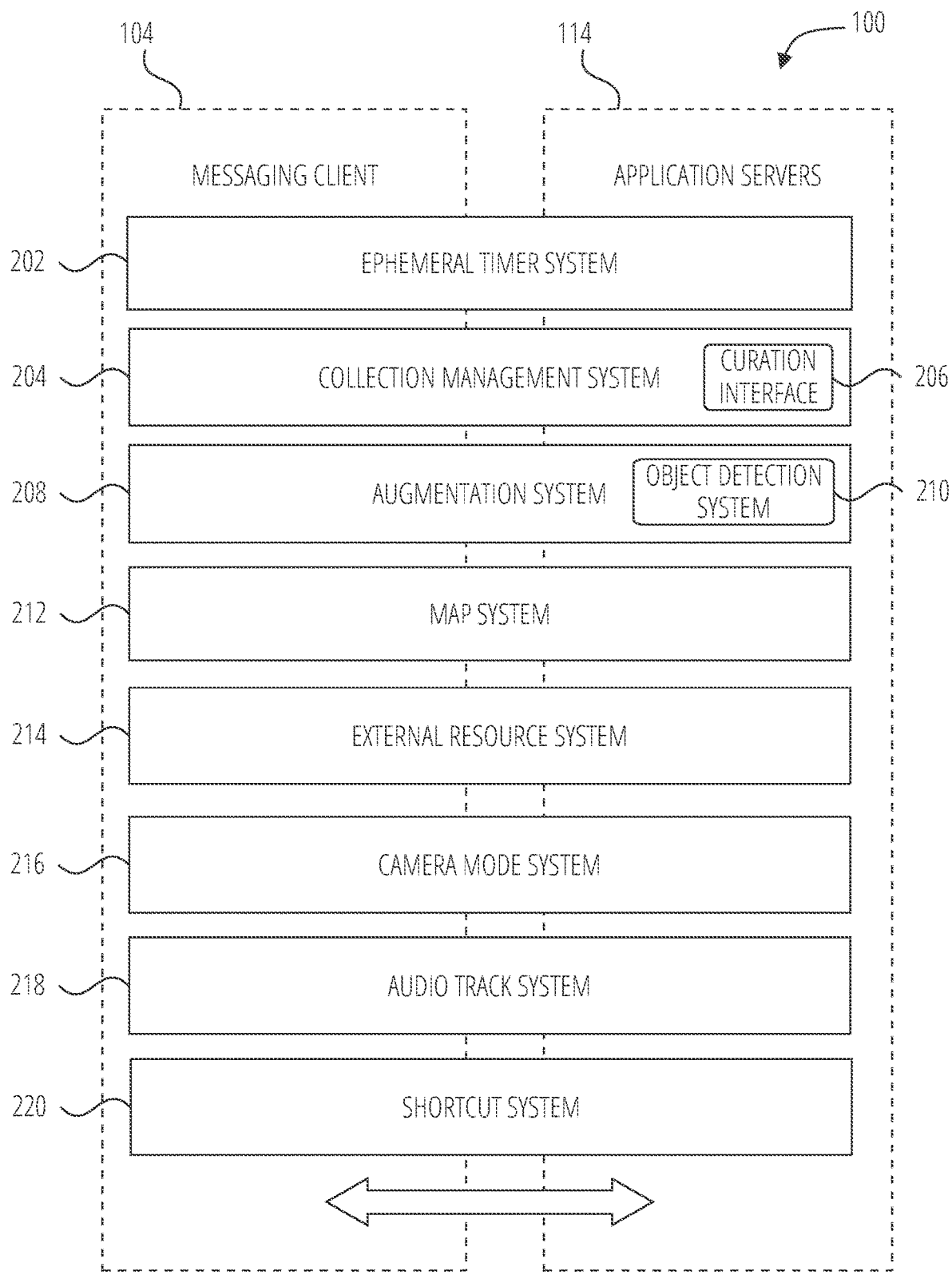
FIG. 2 is a diagrammatic representation of a messaging system, in accordance with some examples, that has both client-side and server-side functionality.

FIG. 2 is a block diagram illustrating further details regarding the messaging system 100, according to some examples. Specifically, the messaging system 100 is shown to comprise the messaging client 104 and the application servers 114. The messaging system 100 embodies a number of subsystems, which are supported on the client-side by the messaging client 104 and on the sever-side by the application servers 114. These subsystems include, for example, an ephemeral timer system 202, a collection management system 204, an augmentation system 208, a map system 212, an external resource system 214, a camera mode system 216, an audio track system 218 and a shortcut system 220.

The ephemeral timer system 202 is responsible for enforcing the temporary or time-limited access to content by the messaging client 104 and the messaging server 118. The ephemeral timer system 202 incorporates a number of timers that, based on duration and display parameters associated with a message, or collection of messages (e.g., a story), selectively enable access (e.g., for presentation and display) to messages and associated content via the messaging client 104. Further details regarding the operation of the ephemeral timer system 202 are provided below.

The collection management system 204 is responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client 104.

The collection management system 204 furthermore includes a curation interface 206 that allows a collection manager to manage and curate a particular collection of content. For example, the curation interface 206 enables an event organizer to curate a collection of content relating to a specific event (e.g., delete inappropriate content or redundant messages). Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 208 provides various functions that enable a user to augment (e.g., annotate or otherwise modify or edit) media content associated with a message. For example, the augmentation system 208 provides functions related to the generation and publishing of media overlays for messages processed by the messaging system 100. The augmentation system 208 operatively supplies a media overlay or augmentation (e.g., an image filter) to the messaging client 104 based on a geolocation of the client device 102. In another example, the augmentation system 208 operatively supplies a media overlay to the messaging client 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text or image that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the augmentation system 208 uses the geolocation of the client device 102 to identify a media overlay that includes the name of a merchant at the geolocation of the client device 102. The media overlay may include other indicia associated with the merchant. The media overlays may be stored in the database 126 and accessed through the database server 120.

In some examples, the augmentation system 208 provides a user-based publication platform that enables users to select a geolocation on a map and upload content associated with the selected geolocation. The user may also specify circumstances under which a particular media overlay should be offered to other users. The augmentation system 208 generates a media overlay that includes the uploaded content and associates the uploaded content with the selected geolocation.

In other examples, the augmentation system 208 provides a merchant-based publication platform that enables merchants to select a particular media overlay associated with a geolocation via a bidding process. For example, the augmentation system 208 associates the media overlay of the highest bidding merchant with a corresponding geolocation for a predefined amount of time.

In other examples, as discussed below with respect to FIG. 3, the augmentation system 208 provides for presenting augmented reality content in association with an image or a video captured by a camera of the client device 102. The augmentation system 208 may implement or otherwise access augmented reality content items (e.g., corresponding to applying Lenses or augmented reality experiences) for providing real-time special effect(s) and/or sound(s) that may be added to the image or video.

In one or more embodiments, the augmentation system 208 includes or otherwise accesses an object detection system 210. For example, the object detection system 210 may be included within the augmentation system 208 (e.g., as shown in the example of FIG. 2) or may be separate and accessible by the augmentation system 208.

The object detection system 210 provides various object detection functions within the context of the messaging system 100. The object detection system 210 may employ one or more object classifiers to identify objects depicted in a captured image. The image may correspond to a live video feed captured by a camera (e.g., rear or front facing camera) of the client device 102. Alternatively or in addition, the image may correspond to an image (e.g., photo) stored in association with the user of the client device 102 (e.g., a photo library).

In one or more embodiments, the object detection system 210 is configured to implement or otherwise access object recognition algorithms (e.g., including machine learning algorithms) configured to scan the captured image, and to detect/track the movement of objects within the image. By way of non-limiting example, detectable objects within an image include: a human face, parts of a human body, animals and parts thereof, landscapes, objects in nature, non-living objects (e.g., articles of clothing, chairs, books, cars, buildings, other structures), illustrations of objects (e.g., on posters and/or flyers), text-based objects, equation-based objects and the like.

In addition, the object detection system 210 is configured to determine or otherwise access attributes of objects. For a particular object, the object detection system 210 may determine or retrieve attributes such as a name/type, genre, color, size, shape, texture, environmental factors (e.g., geolocation, time, weather), and/or other supplemental information (e.g., a song title/artist for an object corresponding to media).

With respect to the environmental factors, the object detection system 210 may receive information from the messaging client 104 to identify the weather, geographical location, time, and so forth around the client device 102 (e.g., via device sensors). The object detection system 210 may rank the retrieved attributes based on relevance, such as based on their association with the one or more environmental factors. Other machine learning techniques may be employed to select and rank retrieved attributes. The object detection system 210 may select an object from the list of objects detected in the captured image that is associated with the highest ranked attributes, and may send an indication of the selected object to the messaging client 104. Alternatively or in addition, the object detection system 210 may provide for communicating one or more attributes (e.g., name/type) for each detected object, and/or an indication of the ranking of the attributes to the messaging client 104.

In one or more embodiments, the object detection system 210 determines that one of the attributes corresponds to a keyword that has been sponsored by a third party. For example, third parties may sponsor or pay for certain keywords to be ranked higher than others. In response to determining that a given attribute corresponds to a sponsored keyword, the object detection system 210 may provide for a higher ranking of that attribute relative to other attributes.

The map system 212 provides various geographic location functions, and supports the presentation of map-based media content and messages by the messaging client 104. For example, the map system 212 enables the display of user icons or avatars (e.g., stored in profile data 302) on a map to indicate a current or past location of "friends" of a user, as well as media content (e.g., collections of messages including photographs and videos) generated by such friends, within the context of a map. For example, a message posted by a user to the messaging system 100 from a specific geographic location may be displayed within the context of a map at that particular location to "friends" of a specific user on a map interface of the messaging client 104. A user can furthermore share his or her location and status information (e.g., using an appropriate status avatar) with other users of the messaging system 100 via the messaging client 104, with this location and status information being similarly displayed within the context of a map interface of the messaging client 104 to selected users.

The external resource system 214 provides an interface for the messaging client 104 to communicate with remote servers (e.g. third-party servers 110) to launch or access external resources, i.e. applications or applets. Each third-party server 110 hosts, for example, a markup language (e.g., HTML5) based application or small-scale version of an application (e.g., game, utility, payment, or ride-sharing application). The messaging client 104 may launches a web-based resource (e.g., application) by accessing the HTML5 file from the third-party servers 110 associated with the web-based resource. In certain examples, applications hosted by third-party servers 110 are programmed in JavaScript leveraging a Software Development Kit (SDK) provided by the messaging server 118. The SDK includes Application Programming Interfaces (APIs) with functions that can be called or invoked by the web-based application. In certain examples, the messaging server 118 includes a JavaScript library that provides a given external resource access to certain user data of the messaging client 104. HTML5 is used as an example technology for programming games, but applications and resources programmed based on other technologies can be used.

In order to integrate the functions of the SDK into the web-based resource, the SDK is downloaded by a third-party server 110 from the messaging server 118 or is otherwise received by the third-party server 110. Once downloaded or received, the SDK is included as part of the application code of a web-based external resource. The code of the web-based resource can then call or invoke certain functions of the SDK to integrate features of the messaging client 104 into the web-based resource.

The SDK stored on the messaging server 118 effectively provides the bridge between an external resource (e.g., applications 106 or applets and the messaging client 104.

This provides the user with a seamless experience of communicating with other users on the messaging client 104, while also preserving the look and feel of the messaging client 104. To bridge communications between an external resource and a messaging client 104, in certain examples, the SDK facilitates communication between third-party servers 110 and the messaging client 104. In certain examples, a Web ViewJavaScriptBridge running on a client device 102 establishes two one-way communication channels between an external resource and the messaging client 104. Messages are sent between the external resource and the messaging client 104 via these communication channels asynchronously. Each SDK function invocation is sent as a message and callback. Each SDK function is implemented by constructing a unique callback identifier and sending a message with that callback identifier.

By using the SDK, not all information from the messaging client 104 is shared with third-party servers 110. The SDK limits which information is shared based on the needs of the external resource. In certain examples, each third-party server 110 provides an HTML5 file corresponding to the web-based external resource to the messaging server 118. The messaging server 118 can add a visual representation (such as a box art or other graphic) of the web-based external resource in the messaging client 104. Once the user selects the visual representation or instructs the messaging client 104 through a GUI of the messaging client 104 to access features of the web-based external resource, the messaging client 104 obtains the HTML5 file and instantiates the resources necessary to access the features of the web-based external resource.

The messaging client 104 presents a graphical user interface (e.g., a landing page or title screen) for an external resource. During, before, or after presenting the landing page or title screen, the messaging client 104 determines whether the launched external resource has been previously authorized to access user data of the messaging client 104. In response to determining that the launched external resource has been previously authorized to access user data of the messaging client 104, the messaging client 104 presents another graphical user interface of the external resource that includes functions and features of the external resource. In response to determining that the launched external resource has not been previously authorized to access user data of the messaging client 104, after a threshold period of time (e.g., 3 seconds) of displaying the landing page or title screen of the external resource, the messaging client 104 slides up (e.g., animates a menu as surfacing from a bottom of the screen to a middle of or other portion of the screen) a menu for authorizing the external resource to access the user data. The menu identifies the type of user data that the external resource will be authorized to use. In response to receiving a user selection of an accept option, the messaging client 104 adds the external resource to a list of authorized external resources and allows the external resource to access user data from the messaging client 104. In some examples, the external resource is authorized by the messaging client 104 to access the user data in accordance with an OAuth 2 framework.

The messaging client 104 controls the type of user data that is shared with external resources based on the type of external resource being authorized. For example, external resources that include full-scale applications (e.g., an application 106) are provided with access to a first type of user data (e.g., only two-dimensional avatars of users with or without different avatar characteristics). As another example, external resources that include small-scale versions of applications (e.g., web-based versions of applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

The camera mode system 216 implements various functions for providing different camera modes within the context of the messaging system 100. For example, the camera mode system 216 provides one or more of a timeline mode, a timer mode and a slow-motion mode. The timeline mode is user-selectable for capturing a series of photos/video clips (or segments) in order to generate a media content item (e.g., based on multiple taps and/or hold-and-press gestures of the capture button), as opposed to a default setting to capture a single photo/video clip to generate a media content item (e.g., based on a single tap or a hold-and-press gesture of the capture button). The timer mode is user-selectable to set a time to begin video capture (e.g., after 5 seconds, 10 seconds, etc.), as opposed to a default setting to immediately between video capture (e.g., in response to a tap or hold-and-press gesture). The slow-motion mode is user selectable for capturing video in slow motion, as opposed to a default setting for capturing video in regular (e.g., non-slow motion) time.

The audio track system 218 implements various functions for adding audio track(s) to captured video (or captured images) with respect to generating a media content item. For example, the audio track system 218 provides for accessing a catalog of available audio tracks, for presenting the available audio tracks for user selection, and for combining selected audio track(s) with captured video or image in order to generate the media content item. In one or more embodiments, the catalog of available audio tracks is maintained by a third-party server (e.g., corresponding to one of the third-party servers 110). For example, the audio track system 218 is configured to access (e.g., download and/or stream) the audio tracks based on licensing arrangements between the messaging system 100 and the third party-server. In one or more embodiments, the audio track system 218 is further configured to access identifying information for a given audio track, such as the title of the audio track (e.g., song name), artist, genre, and the like.

The shortcut system 220 implements various functions for generating, maintaining and storing shortcuts with respect to the messaging system 100. As described herein, a shortcut represents a combination of individual functions that are applied in association with capturing an image. Examples of such individual functions correspond to applying an augmented reality content item (e.g., per the augmentation system 208), applying a camera mode (e.g., per the camera mode system 216) and/or applying an audio track (e.g., per the audio track system 218) with respect to capturing image data (e.g., photo, live video feed). A combination of individual functions corresponds with applying two or more of an augmented reality content item, a camera mode or an audio track with respect to capturing the image. It is noted that other individual functions instead or in addition to augmented reality content items, camera modes and audio tracks may be used as part of the combination for a shortcut.

FIG. 3 is a schematic diagram illustrating data structures 300, which may be stored in the database 126 of the messaging server system 108, according to certain examples. While the content of the database 126 is shown to comprise a number of tables, it will be appreciated that the data could be stored in other types of data structures (e.g., as an object-oriented database).

The database 126 includes message data stored within a message table 306. This message data includes, for any particular one message, at least message sender data, message recipient (or receiver) data, and a payload. Further details regarding information that may be included in a message, and included within the message data stored in the message table 306 is described below with reference to FIG. 4.

An entity table 308 stores entity data, and is linked (e.g., referentially) to an entity graph 304 and profile data 302. Entities for which records are maintained within the entity table 308 may include individuals, corporate entities, organizations, objects, places, events, and so forth. Regardless of entity type, any entity regarding which the messaging server system 108 stores data may be a recognized entity. Each entity is provided with a unique identifier, as well as an entity type identifier (not shown).

The entity graph 304 stores information regarding relationships and associations between entities. Such relationships may be social, professional (e.g., work at a common corporation or organization) interested-based or activity-based, merely for example.

The profile data 302 stores multiple types of profile data about a particular entity. The profile data 302 may be selectively used and presented to other users of the messaging system 100, based on privacy settings specified by a particular entity. Where the entity is an individual, the profile data 302 includes, for example, a user name, telephone number, address, settings (e.g., notification and privacy settings), as well as a user-selected avatar representation (or collection of such avatar representations). A particular user may then selectively include one or more of these avatar representations within the content of messages communicated via the messaging system 100, and on map interfaces displayed by messaging clients 104 to other users. The collection of avatar representations may include "status avatars," which present a graphical representation of a status or activity that the user may select to communicate at a particular time.

Where the entity is a group, the profile data 302 for the group may similarly include one or more avatar representations associated with the group, in addition to the group name, members, and various settings (e.g., notifications) for the relevant group.

The database 126 also stores augmentation data, such as overlays or filters, in an augmentation table 310. The augmentation data is associated with and applied to videos (for which data is stored in a video table 314) and images (for which data is stored in an image table 316).

Filters, in one example, are overlays that are displayed as overlaid on an image or video during presentation to a recipient user. Filters may be of various types, including user-selected filters from a set of filters presented to a sending user by the messaging client 104 when the sending user is composing a message. Other types of filters include geolocation filters (also known as geo-filters), which may be presented to a sending user based on geographic location. For example, geolocation filters specific to a neighborhood or special location may be presented within a user interface by the messaging client 104, based on geolocation information determined by a Global Positioning System (GPS) unit of the client device 102.

Another type of filter is a data filter, which may be selectively presented to a sending user by the messaging client 104, based on other inputs or information gathered by the client device 102 during the message creation process. Examples of data filters include current temperature at a specific location, a current speed at which a sending user is traveling, battery life for a client device 102, or the current time.

Other augmentation data that may be stored within the image table 316 includes augmented reality content items (e.g., corresponding to applying Lenses or augmented reality experiences). An augmented reality content item may provide a real-time special effect and/or sound that may be added to an image or a video.

As described above, augmentation data includes augmented reality content items, overlays, image transformations, AR images, and similar terms refer to modifications that may be applied to image data (e.g., videos or images). This includes real-time modifications, which modify an image as it is captured using device sensors (e.g., one or multiple cameras) of a client device 102 and then displayed on a screen of the client device 102 with the modifications. This also includes modifications to stored content, such as video clips in a gallery that may be modified. For example, in a client device 102 with access to multiple augmented reality content items, a user can use a single video clip with multiple augmented reality content items to see how the different augmented reality content items will modify the stored clip. For example, multiple augmented reality content items that apply different pseudorandom movement models can be applied to the same content by selecting different augmented reality content items for the content. Similarly, real-time video capture may be used with an illustrated modification to show how video images currently being captured by sensors of a client device 102 would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudorandom animations to be viewed on a display at the same time.

Data and various systems using augmented reality content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various examples, different methods for achieving such transformations may be used. Some examples may involve generating a three-dimensional mesh model of the object or objects, and using transformations and animated textures of the model within the video to achieve the transformation. In other examples, tracking of points on an object may be used to place an image or texture (which may be two dimensional or three dimensional) at the tracked position. In still further examples, neural network analysis of video frames may be used to place images, models, or textures in content (e.g., images or frames of video). Augmented reality content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.)

saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of object's elements characteristic points for each element of an object are calculated (e.g., using an Active Shape Model (ASM) or other known methods). Then, a mesh based on the characteristic points is generated for each of the at least one element of the object. This mesh used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method, a background of the modified object can be changed or distorted as well by tracking and modifying the background.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification properties of the mentioned areas can be transformed in different ways. Such modifications may involve changing color of areas; removing at least some part of areas from the frames of the video stream; including one or more new objects into areas which are based on a request for modification; and modifying or distorting the elements of an area or object. In various examples, any combination of such modifications or other similar modifications may be used. For certain models to be animated, some characteristic points can be selected as control points to be used in determining the entire state-space of options for the model animation.

In some examples of a computer animation model to transform image data using face detection, the face is detected on an image with use of a specific face detection algorithm (e.g., Viola-Jones). Then, an Active Shape Model (ASM) algorithm is applied to the face region of an image to detect facial feature reference points.

Other methods and algorithms suitable for face detection can be used. For example, in some examples, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some examples, a search for landmarks from the mean shape aligned to the position and size of the face determined by a global face detector is started. Such a search then repeats the steps of suggesting a tentative shape by adjusting the locations of shape points by template matching of the image texture around each point and then conforming the tentative shape to a global shape model until convergence occurs. In some systems, individual template matches are unreliable, and the shape model pools the results of the weak template matches to form a stronger overall classifier. The entire search is repeated at each level in an image pyramid, from coarse to fine resolution.

A transformation system can capture an image or video stream on a client device (e.g., the client device 102) and perform complex image manipulations locally on the client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the client device 102.

In some examples, a computer animation model to transform image data can be used by a system where a user may capture an image or video stream of the user (e.g., a selfie) using a client device 102 having a neural network operating as part of a messaging client 104 operating on the client device 102. The transformation system operating within the messaging client 104 determines the presence of a face within the image or video stream and provides modification icons associated with a computer animation model to transform image data, or the computer animation model can be present as associated with an interface described herein. The modification icons include changes that may be the basis for modifying the user's face within the image or video stream as part of the modification operation. Once a modification icon is selected, the transform system initiates a process to convert the image of the user to reflect the selected modification icon (e.g., generate a smiling face on the user). A modified image or video stream may be presented in a graphical user interface displayed on the client device 102 as soon as the image or video stream is captured, and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured, and the selected modification icon remains toggled. Machine taught neural networks may be used to enable such modifications.

The graphical user interface, presenting the modification performed by the transform system, may supply the user with additional interaction options. Such options may be based on the interface used to initiate the content capture and selection of a particular computer animation model (e.g., initiation from a content creator user interface). In various examples, a modification may be persistent after an initial selection of a modification icon. The user may toggle the modification on or off by tapping or otherwise selecting the face being modified by the transformation system and store it for later viewing or browse to other areas of the imaging application. Where multiple faces are modified by the transformation system, the user may toggle the modification on or off globally by tapping or selecting a single face modified and displayed within a graphical user interface. In some examples, individual faces, among a group of multiple faces, may be individually modified, or such modifications may be individually toggled by tapping or selecting the individual face or a series of individual faces displayed within the graphical user interface.

A story table 312 stores data regarding collections of messages and associated image, video, or audio data, which are compiled into a collection (e.g., a story or a gallery). The creation of a particular collection may be initiated by a particular user (e.g., each user for which a record is maintained in the entity table 308). A user may create a "personal story" in the form of a collection of content that has been created and sent/broadcast by that user. To this end, the user interface of the messaging client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from varies locations and events. Users whose client devices have location services enabled and are at a common location event at a particular time may, for example, be presented with an option, via a user interface of the messaging client 104, to contribute content to a particular live story. The live story may be identified to the user by the messaging client 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some examples, a contribution to a location story may require a second degree of authentication to verify that the end user belongs to a specific organization or other entity (e.g., is a student on the university campus).

As mentioned above, the video table 314 stores video data that, in one example, is associated with messages for which records are maintained within the message table 306. Similarly, the image table 316 stores image data associated with messages for which message data is stored in the entity table 308. The entity table 308 may associate various augmentations from the augmentation table 310 with various images and videos stored in the image table 316 and the video table 314.

A shortcuts table 318 stores a collection of available shortcuts for applying with respect to capturing an image. The shortcut system 220 is configured to generate and store a representation of shortcuts within the shortcuts table 318. For each shortcut, the shortcuts table 318 stores a respective indication of the shortcut name, the combination of functions (e.g., two or more of an augmented reality content item, camera mode or audio track) for the shortcut, and available preview(s) for a shortcut. For example, a preview corresponds to a sample media content item which applied the shortcut with respect to another captured image (e.g., by another user). Moreover, the shortcuts table 318 is configured to store object attribute(s) (e.g., as metadata) in association with shortcuts. For example, the object attribute(s) may indicate one or more of an object type, name of the object, color, size and/or shape associated with a particular shortcut.

Figure 4:
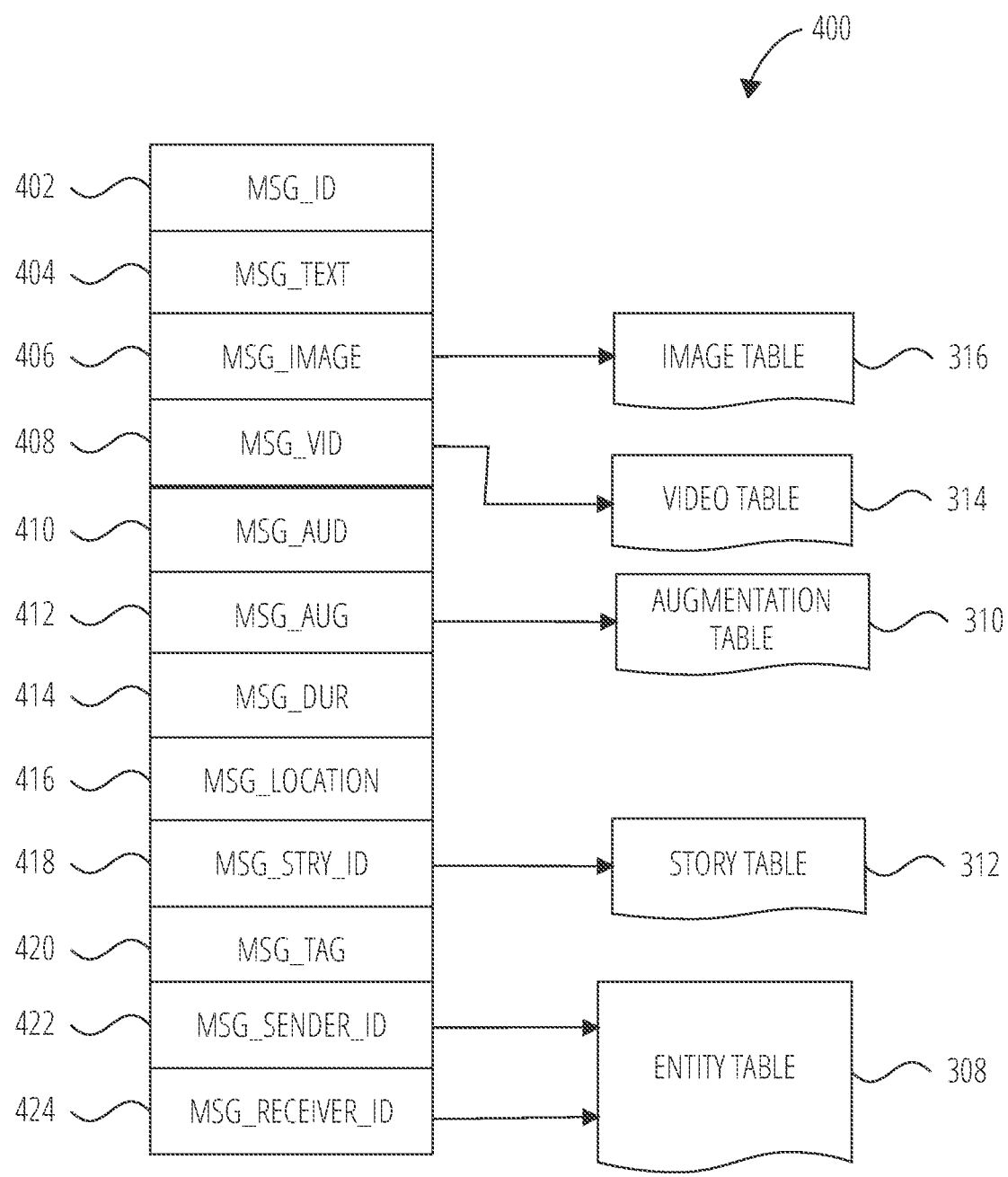
FIG. 4 is a diagrammatic representation of a message, in accordance with some examples.

FIG. 4 is a schematic diagram illustrating a structure of a message 400, according to some examples, generated by a messaging client 104 for communication to a further messaging client 104 or the messaging server 118. The content of a particular message 400 is used to populate the message table 306 stored within the database 126, accessible by the messaging server 118. Similarly, the content of a message 400 is stored in memory as "in-transit" or "in-flight" data of the client device 102 or the application servers 114. A message 400 is shown to include the following example components:

- message identifier 402: a unique identifier that identifies the message 400.
- message text payload 404: text, to be generated by a user via a user interface of the client device 102, and that is included in the message 400.
- message image payload 406: image data, captured by a camera component of a client device 102 or retrieved from a memory component of a client device 102, and that is included in the message 400. Image data for a sent or received message 400 may be stored in the image table 316.
- message video payload 408: video data, captured by a camera component or retrieved from a memory component of the client device 102, and that is included in the message 400. Video data for a sent or received message 400 may be stored in the video table 314.
- message audio payload 410: audio data, captured by a microphone or retrieved from a memory component of the client device 102, and that is included in the message 400.
- message augmentation data 412: augmentation data (e.g., filters, stickers, or other annotations or enhancements) that represents augmentations to be applied to message image payload 406, message video payload 408, or message audio payload 410 of the message 400. Augmentation data for a sent or received message 400 may be stored in the augmentation table 310.
- message duration parameter 414: parameter value indicating, in seconds, the amount of time for which content of the message (e.g., the message image payload 406, message video payload 408, message audio payload 410) is to be presented or made accessible to a user via the messaging client 104.
- message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image into within the message image payload 406, or a specific video in the message video payload 408).

message story identifier 418: identifier values identifying one or more content collections (e.g., "stories" identified in the story table 312) with which a particular content item in the message image payload 406 of the message 400 is associated. For example, multiple images within the message image payload 406 may each be associated with multiple content collections using identifier values.

message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

message sender identifier 422: an identifier (e.g., a messaging system identifier, email address, or device identifier) indicative of a user of the Client device 102 on which the message 400 was generated and from which the message 400 was sent.

message receiver identifier 424: an identifier (e.g., a messaging system identifier, email address, or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 316. Similarly, values within the message video payload 408 may point to data stored within a video table 314, values stored within the message augmentations 412 may point to data stored in an augmentation table 310, values stored within the message story identifier 418 may point to data stored in a story table 312, and values stored within the message sender identifier 422 and the message receiver identifier 424 may point to user records stored within an entity table 308.

Figure 5:
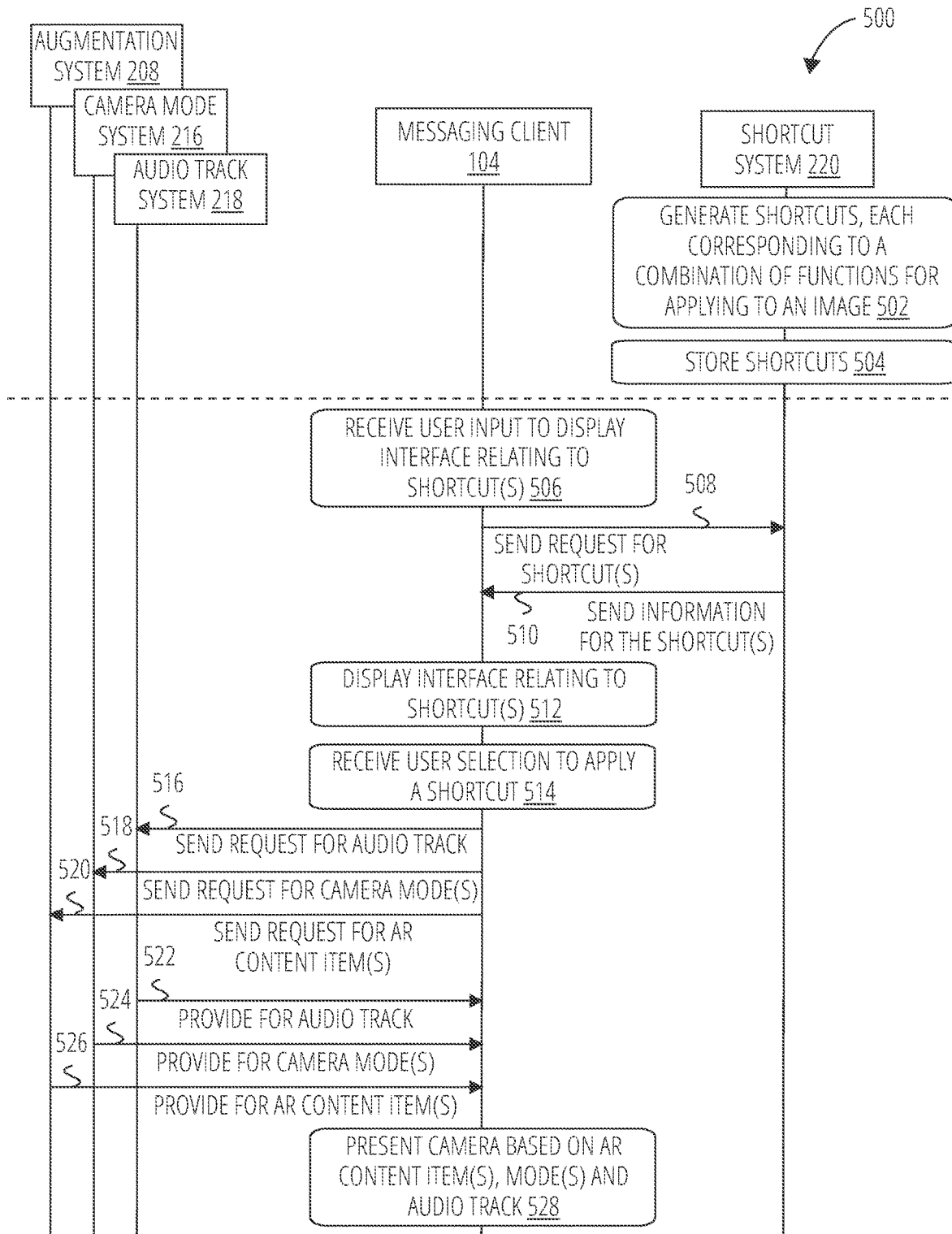
FIG. 5 is an interaction diagram illustrating a process for performing a shortcut, which represents a combination of individual functions applied in association with capturing an image, in accordance with some example embodiments.

FIG. 5 is an interaction diagram illustrating a process 500 for performing a shortcut, which represents a combination of individual functions applied in association with capturing an image, in accordance with some example embodiments. For explanatory purposes, the process 500 is primarily described herein with reference to the messaging client 104 of FIG. 1, the augmentation system 208, the camera mode system 216, the audio track system 218 and the shortcut system 220 of FIG. 2. However, one or more blocks (or operations) of the process 500 may be performed by one or more other components, and/or by other suitable devices. Further for explanatory purposes, the blocks (or operations) of the process 500 are described herein as occurring in serial, or linearly. However, multiple blocks (or operations) of the process 500 may occur in parallel or concurrently. In addition, the blocks (or operations) of the process 500 need not be performed in the order shown and/or one or more blocks (or operations) of the process 500 need not be performed and/or can be replaced by other operations. The process 500 may be terminated when its operations are completed. In addition, the process 500 may correspond to a method, a procedure, an algorithm, etc.

The messaging client 104 may be associated with a respective user of the messaging server system 108, and the user may be associated with a user account of the messaging server system 108. As noted above, the user may be identified by the messaging server system 108 based on a unique identifier (e.g., a messaging system identifier, email address and/or a device identifier) associated with the user account for that user. In addition, the messaging server system 108 may implement and/or work in conjunction with the social network server 124 which is configured to identify other users (e.g., friends) with which a particular user has relationships.

As described herein, the messaging client 104 (e.g., in conjunction with the messaging server system 108) provides one or more user interfaces for applying shortcut(s) to image data. As noted above, a shortcut corresponds to a combination of individual functions. With a single gesture (e.g., tap or press), the user may select a particular shortcut from a list of available shortcuts. In response, the messaging client 104 applies the selected shortcut, corresponding to the combination of individual functions, with respect to an image captured by the device camera.

In the example of FIG. 5, operations block 502-504 may correspond to a first phase and operations operation 508-block 528 may correspond to a second phase. The first phase relates to the generation and storage of shortcuts within a database (e.g., the shortcuts table 318). Moreover, the second phase relates to presenting available shortcuts and applying a selected shortcut with respect to image data captured by a device camera. It may be understood that the second phase may occur shortly after the first phase, or after an extended period of time after the first phase. As such, FIG. 6 includes a dashed line separating the first phase and the second phase for illustrative purposes.

At block 502, the shortcut system 220 generates shortcuts (e.g., with each shortcut corresponding to a combination of individual functions) for performing with respect to an image captured by a device camera. The image may correspond to a live video feed captured by a camera (e.g., rear or front facing camera) of the client device 102. Alternatively or in addition, the image may correspond to an image (e.g., photo) stored in association with the user of the client device 102 (e.g., a photo library).

The shortcut system 220 may correspond to a subsystem of the messaging system 100, and may be supported on the client side by the messaging client 104 and/or on the server side by the application servers 114. As such, the generation of shortcut(s) may be implemented client side, server side and/or a combination of client side and server side.

Shortcuts may be generated manually (e.g., by a system administrator) in conjunction with appropriate interfaces provided by the shortcut system 220. Alternatively, the shortcut system 220 may provide for automatically generating shortcuts based on a combination of individual functions associated with prior media content items stored by the system (e.g., popular media content items within a content feed, as discussed below).

In the example of FIG. 5, a shortcut is depicted as applying a combination of all three of an augmented reality content item (e.g., per the augmentation system 208), a camera mode (e.g., per the camera mode system 216) and an audio track (e.g., per the audio track system 218) with respect to the captured image. As noted above, however, a shortcut may apply a combination of any two of the augmented reality content item, camera mode, audio track, or other individual functions.

In addition, a single shortcut may have multiple augmented reality content items, camera modes and/or audio tracks associated therewith. For example, in a case where the timeline mode is included, each clip (or segment) of the series of video clip may be associated with a respective augmented reality content item and/or audio track. A default augmented reality content item and/or audio track may be predefined for the shortcut, so as to apply the default augmented reality content item and/or audio track when the shortcut is activated. The remaining augmented reality content items and/or audio tracks may be presented as selectable options when the shortcut is applied.

The shortcut system 220 stores the shortcuts (block 504). For example, the shortcut system 220 is configured to store the shortcuts within the shortcuts table 318. As noted above, the shortcuts table 318 stores, for each shortcut, a respective indication of the shortcut name, the combination of functions for the shortcut, available preview(s) for the shortcut, and/or object attribute(s) associated with the shortcut. In a case where a shortcut includes multiple augmented reality content items, the shortcuts table 318 may further store an indication of the above-noted default augmented reality content item.

The messaging client 104 receives user input to display an interface relating to one or more of the stored shortcuts (block 506). As described herein, the messaging client 104 provides different user interfaces with a user-selectable element to apply a particular shortcut.

For example, available shortcuts may be represented as a list of selectable elements (e.g., icons) within a camera center interface, as discussed further below with respect to FIGS. 7A-7B. The camera center interface may be surfaced in response to user selection of a corresponding icon (e.g., a camera interface button) when capturing an image via the device camera. In one or more embodiments, the camera center interface includes a first section for selecting to activate different modes, such as the above-mentioned timeline mode, timer mode, and slow motion mode. In addition, the camera center interface includes a second section for displaying a list of available shortcuts, for example, corresponding to all available shortcuts stored in the shortcuts table 318.

In another example, an available shortcut may be represented as a selectable element (e.g., icon) in association with display of a media content item, as discussed further below with respect to FIG. 9. For example, the media content item may be displayed as part of a content feed provided by the messaging system 100. For example, the messaging system 100 may provide different types of content feeds that are selectable for viewing by the user. As noted above, the messaging system 100 allows end users to broadcast media content (e.g., media content items, Stories) to other users of the messaging system 100. In a first example of a content feed, the messaging system 100 may select a set of media content items for viewing based on overall user popularity of submitted media content (e.g., based on a number of system-wide views, user-submitted comments, user-submitted endorsements, and the like). In another example of a content feed, the messaging system 100 provides content collections (e.g., Stories) associated with friends of a user. In another example of a content feed, the messaging system 100 provides content collections associated with system publishers (e.g., merchants, social media influencers, businesses, advertisers, and the like). In some cases, a particular media content item within a content feed may have a corresponding shortcut associated therewith (e.g., with a combination of augmented reality content item(s), camera mode(s) and/or audio tracks). In such a case, the messaging client 104 may display the selectable element (e.g., icon) in association with display of the media content item.

In yet another example, one or more shortcuts may be represented as respective selectable elements (e.g., icons) within a scan results interface, as discussed further below with respect to FIGS. 10A-10C. As discussed below with respect to FIG. 6, a user may initiate a scan operation to detect objects within a captured image. In response, the messaging client 104 provides the scan results interface which may indicate one or more shortcuts related to the detected objects. Moreover, the scan results interface may include additional sections that indicate the identified objects, and/or that present available augmented reality content items related to the object for applying to the captured image.

Thus, at block 506, the messaging client 104 receives user input (e.g., user selection of the camera center interface icon, user selection of a content feed, user selection to perform a scan operation) to display a respective interface relating to shortcuts. In response to receiving the user input, the messaging client 104 sends a request for the shortcut(s) (operation 508) to the shortcut system 220. The shortcut system 220 sends, in response to the request, information for the shortcut(s) to the messaging client 104 (operation 510). Moreover, the messaging client 104 displays the respective interface (e.g., camera center interface, media content item, scan results interface) together with the shortcuts that relate to that interface (block 512).

At block 514, the messaging client 104 receives user selection to apply a shortcut with respect to a captured image. In a case where the camera center interface is displayed, the user may select one of the selectable elements (e.g., icons) from the list of selectable elements corresponding to available shortcuts. In a case where the media content item is displayed, the user may select the selectable element (e.g., icon) associated with display of the media content item. In a case where the scan results interface is displayed, the user may select one of the selectable elements (e.g., icons) from the list of selectable elements corresponding to shortcuts related to object(s) detected in the captured image.

The example of FIG. 5 corresponds with a shortcut which applies a combination of all three of an audio track, camera mode(s) and augmented reality content item(s) to captured image data. Thus, the messaging client 104 sends: a request to the audio track system 218 for the audio track corresponding to the selected shortcut (operation 516); a request to the camera mode system 216 for the camera mode(s) corresponding to the selected shortcut (operation 518); and a request to the augmentation system 208 for the augmented reality content item(s) corresponding to the selected shortcut (operation 520). As noted above, each of the augmentation system 208, camera mode system 216 and audio track system 218 may correspond to a subsystem of the messaging system 100, and may be supported on the client side by the messaging client 104 and/or on the server side by the application servers 114.

The audio track system 218, camera mode system 216 and augmentation system 208 provide for a respective audio track (operation 522), camera mode(s) (operation 524), and augmented reality content item(s) (operation 526) with respect to the captured image data. The messaging client 104 presents the camera based on the combination of the audio track, camera mode(s) and augmented reality content item(s) (block 528). In other words, image data captured by the camera is presented in real-time and modified based on the audio track, camera mode(s) and augmented reality content item(s).

In one or more embodiments, in association with the applying, the messaging client 104 displays a banner indicating the combination of individual functions corresponding to the shortcut. In addition, the banner indicates a name of the shortcut, as well as a second user-selectable element (e.g., icon) to stop applying the combination of individual functions to the captured image data.

In one or more embodiments, the user may select an interface element (e.g., a button) for generating a media content item based on the captured image data. For example, user selection of the button provides for generating a media content item includes an image (e.g., in response to a press/tap gesture of the button) and/or a video (e.g., in response to a press-and-hold gesture of the button). The media content item may be sent as a message to friends, included in a Story, and the like.

By virtue of generating, maintaining and storing shortcuts for combining individual functions, it is possible to reduce the amount of user input typically required for performing the individual functions. As noted above, a shortcut may be applied via a single user gesture (e.g., tap, press) selecting the shortcut. Without providing shortcuts, end users may be required to perform several gestures in order to perform the combination of individual functions. Thus, the messaging system 100 saves time for the user, and reduces computational resources/processing power associated having to separately apply the individual functions. Moreover, the user interfaces display available shortcuts may be more engaging for users of the messaging system 100.

Figure 6:
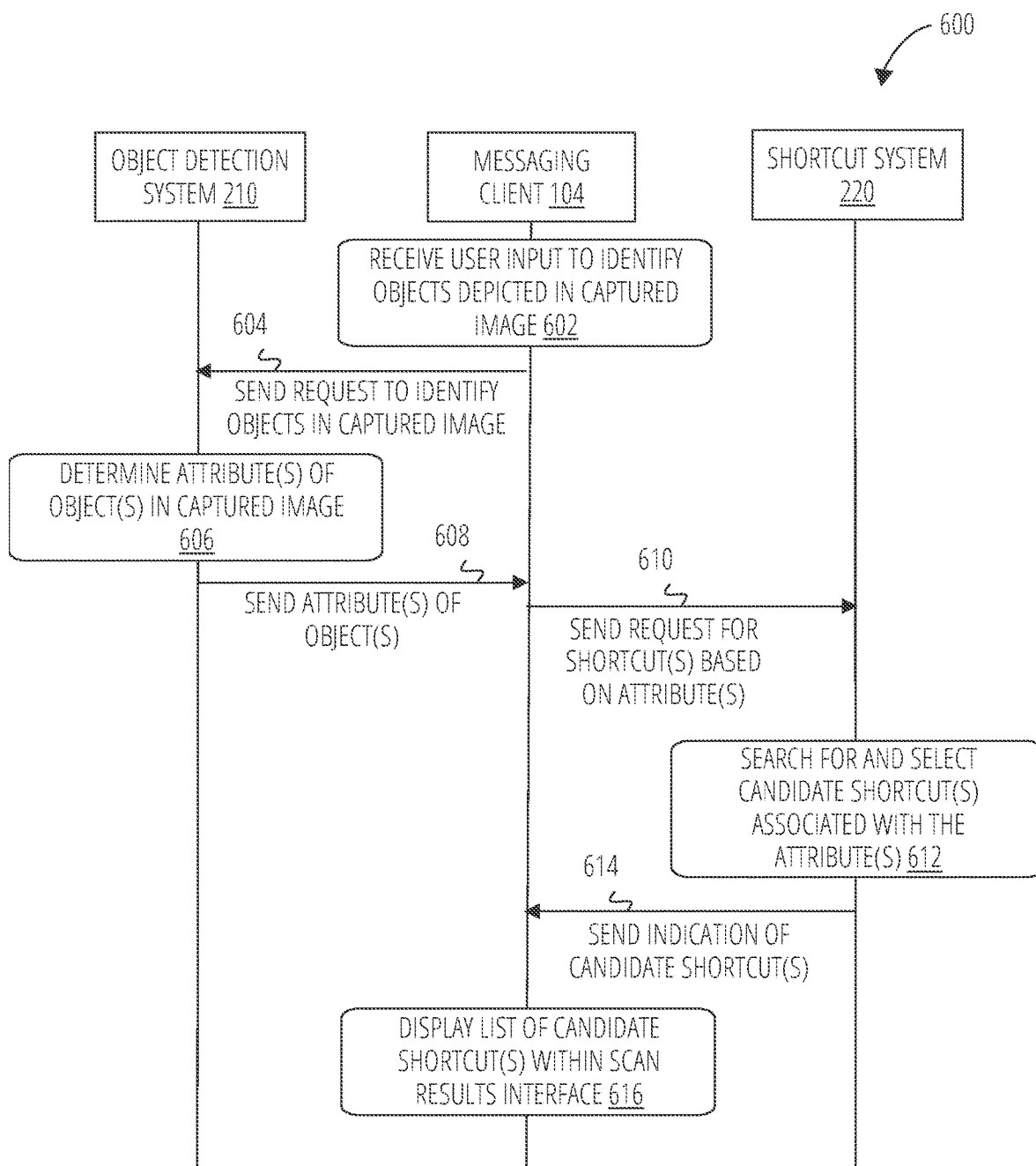
FIG. 6 is an interaction diagram illustrating a process for presenting an available shortcut based on an object detected in a captured image, in accordance with some example embodiments.

FIG. 6 is an interaction diagram illustrating a process 600 for presenting an available shortcut based on an object detected in a captured image, in accordance with some example embodiments. For explanatory purposes, the process 600 is primarily described herein with reference to the messaging client 104 of FIG. 1, and the object detection system 210 and shortcut system 220 of FIG. 2. However, one or more blocks (or operations) of the process 500 may be performed by one or more other components, and/or by other suitable devices. Further for explanatory purposes, the blocks (or operations) of the process 600 are described herein as occurring in serial, or linearly. However, multiple blocks (or operations) of the process 600 may occur in parallel or concurrently. In addition, the blocks (or operations) of the process 600 need not be performed in the order shown and/or one or more blocks (or operations) of the process 600 need not be performed and/or can be replaced by other operations. The process 600 may be terminated when its operations are completed. In addition, the process 600 may correspond to a method, a procedure, an algorithm, etc.

As noted above, the messaging client 104 provides different interfaces for presenting available shortcuts. One such interface is the scan results interface, which is displayed in response to user input to perform a scan operation. FIG. 6 corresponds with surfacing shortcut(s) based on an object detected from a scan operation. In this regard, the process 600 of FIG. 6 generally corresponds with operations 506-512 of FIG. 5.

At block 602, the messaging client 104 receives user input to identify objects depicted in a captured image. In one or more embodiments, the messaging client 104 activates the camera of the client device 102 (e.g., upon startup of the messaging client 104). The messaging client 104 allows a user to request to scan one or more items in a camera feed captured by the camera. In one or more embodiments, the messaging client 104 detects physical contact between a finger of the user's hand and a region of the touch screen for a threshold period of time. For example, the messaging client 104 determines that the user touched and held their finger on the screen for a threshold time (e.g., two seconds).

Alternatively or in addition, the messaging client 104 receives a user selection of a dedicated scan option (e.g., a button) presented together with the camera feed. In response, the messaging client 104 in conjunction with the object detection system 210 captures an image being displayed on the screen and processes the image to identify multiple objects based in the image. In an alternative embodiment, the captured image may correspond to an image/video stored in association with the user of the client device 102, for example, within a photo library (e.g., associated with an operating system of the client device 102 and/or associated with a user profile with respect to the messaging system 100).

The messaging client 104 sends, to the object detection system 210, a request to identify objects in the captured image (operation 604). The request may include the image data itself (e.g., if being captured in real time and/or stored locally on the client device 102). Alternatively, the request may reference a remote image (e.g., if stored in association with a user profile with respect to the messaging system 100).

The object detection system 210 determines attribute(s) of object(s) in the captured image (block 606). As noted above, the object detection system 210 may correspond to a subsystem of the messaging system 100, and may be supported on the client side by the messaging client 104 and/or on the server side by the application servers 114. In one or more embodiments, the detection of object(s) within a captured image may be implemented client side, server side and/or a combination of client side and server side.

As further noted above, the object detection system 210 is configured to implement or otherwise access object recognition algorithms (e.g., including machine learning algorithms) configured to scan a captured image, and to detect/track the movement of objects within the image. For example, types of objects detectable by the object detection system 210 include but are not limited to: a human face, parts of a human body, animals and parts thereof, landscapes, objects in nature, non-living objects (e.g., chairs, books, cars, buildings, other structures), illustrations of objects (e.g., on posters and/or flyers), text-based objects, equation-based objects and the like. Moreover, the object detection system 210 is configured to determine or otherwise access attributes of objects, such as a name, type, genre, color, size, shape, texture, geolocation and/or other supplemental information (e.g., a song title/artist for an object corresponding to media).

The object detection system 210 is further configured to determine or otherwise access attributes of the identified objects. For example, with respect to objects corresponding to articles of clothing, the object detection system 210 may determine attributes such as the object type (e.g., dog, chair), a name of the object (e.g., name/model of a particular chair), color, size and/or shape. As noted above, the object detection system 210 may also determine attribute(s) corresponding to a keyword that has been sponsored by a third party. In response to determining that a given attribute corresponds to a sponsored keyword, the object detection system 210 may provide for a higher ranking of that attribute relative to other attributes.

The object detection system 210 sends, to the messaging client 104, attribute(s) of the object(s) to the messaging client 104 (operation 608). In doing so, the object detection system 210 may further provide ranking information of the attribute(s).

The messaging client 104 sends, to the shortcut system 220, a request for shortcut(s) based on the attribute(s) received from the object detection system 210 (operation 610). For example, if a single object (e.g., a dog) is depicted in the captured image, the request may include attribute(s) (e.g., dog, breed of dog, color, etc.) related to the single object. In another example, if multiple objects (e.g., multiple animals, a person and an animal, an animal and a landscape) are depicted in the captured image, the request may include respective attribute(s) for the multiple objects.

The shortcut system 220 searches and selects one or more candidate shortcut(s) that are associated with the attribute(s) received from the messaging client 104 (block 612). As noted above, the shortcut system 220 may correspond to a subsystem of the messaging system 100, and may be supported on the client side by the messaging client 104 and/or on the server side by the application servers 114. In one or more embodiments, the selection of shortcut(s) via the shortcut system 220 may be implemented client side, server side and/or a combination of client side and server side.

The shortcut system 220 is configured to search the shortcuts table 318 for one or more shortcuts corresponding to the attribute(s) received from the messaging client 104. As noted above, the shortcuts table 318 stores attribute(s) (e.g., as metadata) in association with shortcuts. Further, a particular shortcut may have one or more augmented reality content items associated therewith. Each of the one or more augmented reality content items may in turn have attribute(s) (e.g., metadata) associated therewith. In one or more embodiments, the attribute(s) stored in association with a particular shortcut may correspond to the union of attribute(s) associated with the one or more augmented reality content items of the shortcut. The shortcut system 220 may perform the search by comparing the attribute(s) (e.g., object type, name of the object, color, size and/or shape) received at operation 610 with corresponding attribute(s) associated with shortcuts stored within the shortcuts table 318.

In one or more embodiments, the shortcut system 220 may prioritize higher-ranked attribute(s) over lower-ranked attribute(s). In a case where the received attribute(s) correspond to multiple objects, the shortcut system 220 may select a corresponding set of shortcuts based on the attribute(s). In a case where the attribute(s) correspond to a single object, the shortcut system 220 may select a single shortcut corresponding to the attribute(s).

The shortcut system 220 may calculate respective relevancy scores for shortcuts, for example, based on a number or frequency of confirmed matches between matching attributes. The relevancy scores may be used to limit the number of shortcuts that are selected (e.g., a predefined number, such as three shortcuts) and/or to display the shortcuts in ranked order.

Thus, at block 612, the shortcut system 220 determines candidate shortcut(s) for sending to the messaging client 104. Each shortcut corresponds to a combination of individual functions (e.g., at least two of an augmented reality content item, a camera mode, an audio track, or another function) to apply to the captured image. Upon completion of the selecting the candidate shortcut(s), the shortcut system 220 sends an indication of the selected shortcut(s) to the messaging client 104, together with relevancy scores, if applicable (operation 614).

The messaging client 104 displays the selected shortcuts within a scan results interface (block 616). As noted above with respect to FIG. 5, the scan results interface indicates one or more shortcuts related to the detected objects. Moreover, the scan results interface includes additional sections that indicate the identified objects, and/or that present available augmented reality content items related to the object for applying to the captured image. The scan results interface may include additional sections that indicate the identified objects, and/or that present available augmented reality content items related to the object for applying to the captured image.

The shortcuts are displayed as user-selectable entries within the scan results interface, for applying the respective shortcut to captured image data (e.g., a live video feed). As noted above, FIG. 6 may correspond with operations 506-512 of FIG. 5. Thus, after the completion of block 616 in FIG. 6, the messaging system 100 may subsequently provide for receiving user selection of a shortcut, and applying the selected shortcut per operations 514-528 of FIG. 5.

Figure 7:
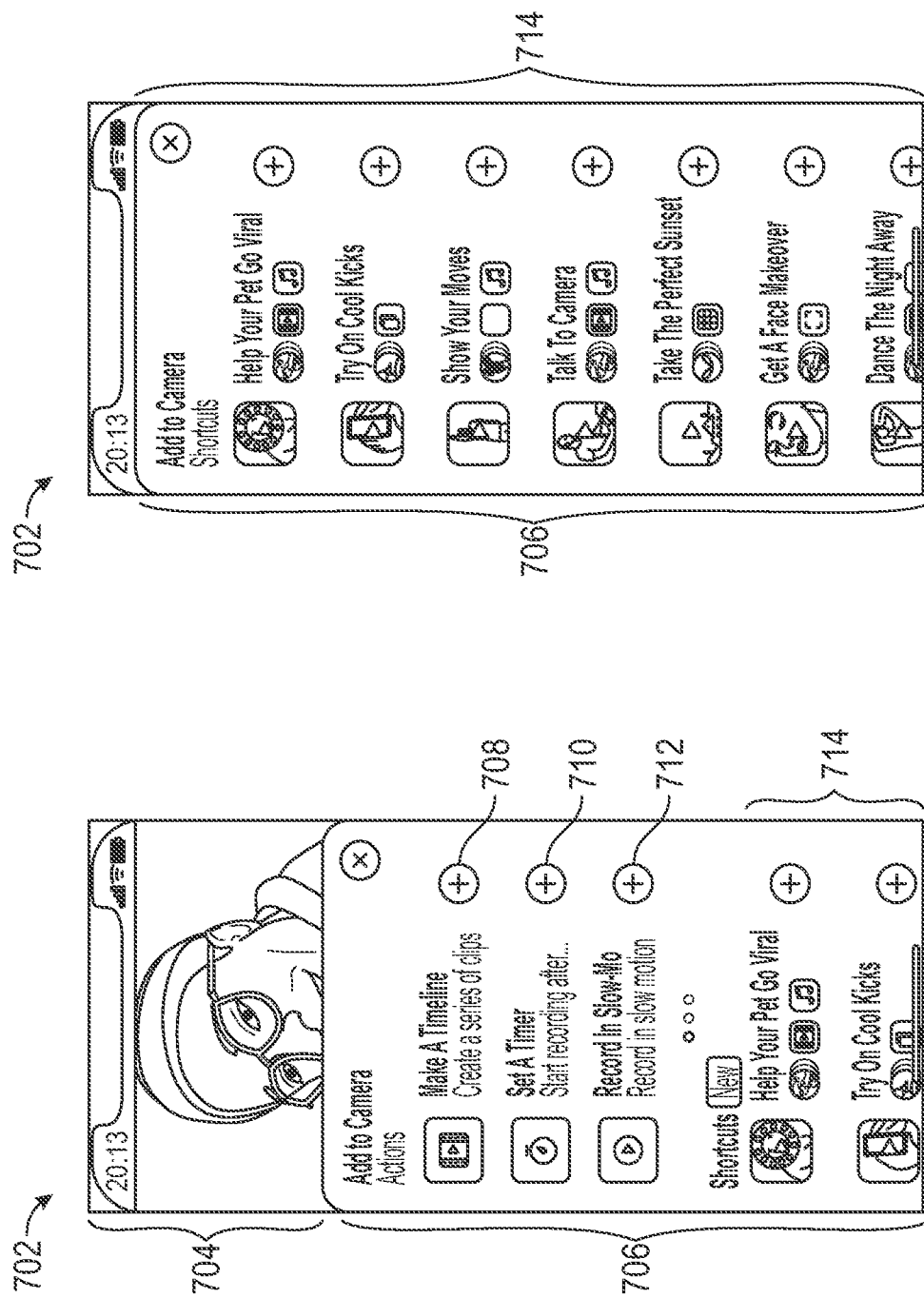
FIGS. 7A-7B illustrate an example user interface for presenting a list of available shortcuts, in accordance with some example embodiments.

FIGS. 7A-7B illustrate an example user interface 702 for presenting a list of available shortcuts, in accordance with some example embodiments. The user interface 702 includes a captured image 704, and a camera center interface 706. The camera center interface 706 includes a timeline mode button 708, a timer mode button 710, a slow motion mode button 712 and a list of shortcuts 714. FIG. 7A depicts a top portion of the camera center interface 706 (which is scrollable), while FIG. 7B depicts a bottom portion of the camera center interface 706 after scrolling down.

As noted above with respect to FIG. 5, the messaging client 104 may present the user interface 702 in response to user selection of a corresponding icon (e.g., a camera interface button, not shown) when capturing an image (e.g., the captured image 704) via the device camera. A first section of the camera center interface 706 provides user-selectable elements 708-712 for respectively activating the timeline mode, timer mode and slow motion mode.

The camera center interface 706 includes a second section for displaying a list of shortcuts 714. As shown in the example of FIGS. 7A-7B, the list of shortcuts 714 presents separate entries for available shortcuts (e.g., as stored in the shortcuts table 318). Each entry within the list of shortcuts 714 includes a name of the shortcut, a preview button (e.g., depicted as a thumbnail) for previewing the shortcut, a group of icons that respectively depict or otherwise represent the individual functions that are combined in association with the shortcut, and a user-selectable element (the "+" icon) for applying the shortcut to the captured image 704.

As noted above, it is possible for some shortcuts to have multiple augmented reality content items, camera modes and/or audio tracks associated therewith. In the example of FIG. 7B, the first "help your pet go viral" shortcut is depicted with a corresponding group of icons corresponding to multiple augmented reality content items (in a stacked fashion), the timeline mode being enabled, and an audio track.

Figure 8:
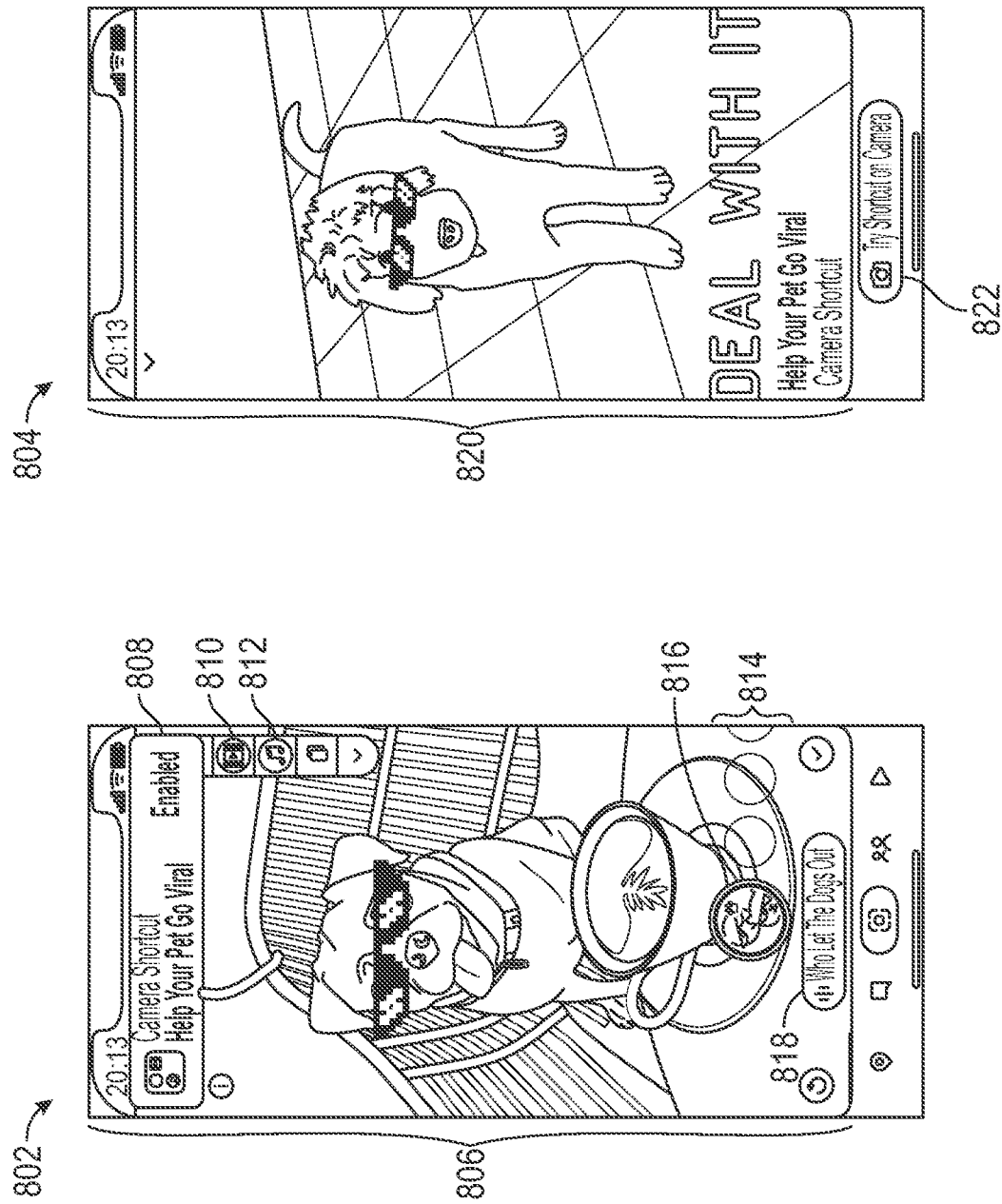
FIGS. 8A-8B illustrate example user interfaces for applying a shortcut with respect to a captured image and for presenting a preview for a shortcut, in accordance with some example embodiments.

FIGS. 8A-8B illustrate example user interfaces for applying a shortcut with respect to a captured image and for presenting a preview for a shortcut, in accordance with some example embodiments. For example, FIG. 8A depicts a user interface 802 for applying a shortcut with respect to a captured image 806. The user interface 802 includes the captured image 806, a banner 808, a timeline mode button 810, an audio track button 812, a carousel interface 814, a selected AR icon 816 and an audio track title 818.

The carousel interface 814 allows the user to cycle through and/or select different augmented reality content items to apply/display with respect to the captured image 806. Each of the available augmented reality content items is represented by an icon which is user-selectable for switching to the respective augmented reality content item. In one or more embodiments, the icon corresponding to an active augmented reality content item (e.g., the selected AR icon 816) is displayed in a different manner relative to (e.g., larger than) the remaining icons. User selection of the selected AR icon 816 provides for generating a media content item which includes an image (e.g., in response to a press/tap gesture of selected AR icon 816) and/or a video (e.g., in response to a press-and-hold gesture of the selected AR icon 816) of the screen content, for example, to send to friends, include in a Story, and the like.

In one or more embodiments, the user interface 802 is presented by the messaging client 104 in response to user selection to apply a selected shortcut to captured image data. As noted above with respect to FIG. 5, a shortcut may be selected via difference user interfaces, including a camera center interface, a scan results interface and display of a media content item. In addition, a selected shortcut corresponds to applying a combination of individual functions.

In the example of FIG. 8A, the combination of individual functions includes an augmented reality content item, a timeline mode and an audio track. In one or more embodiments, the augmented reality content item is indicated by the enabled (e.g., highlighted) display of the timeline mode button 810, as well as by the selected AR icon 816 which indicates the active augmented reality content item. In the example of FIG. 8A, the augmented reality content item overlays virtual sunglasses on a dog depicted in the captured image 806 (e.g., corresponding to real-time video). Additional augmented reality content items for the shortcut may be presented as prioritized (e.g., higher-ranked) augmented reality content items within the carousel interface 814. The audio track is indicated by the enabled (e.g., highlighted) display of the audio track button 812, as well as by the audio track title 818 (e.g., which may further include artist name in some embodiments).

In addition, the banner 808 is configured to display information relating to the selected shortcut. The banner 808 indicates a name of the shortcut (e.g., "help your pet go viral"). In addition, the banner 808 includes a user-selectable element (e.g., "enabled" icon) to stop applying the shortcut with respect to the captured image data.

In another example, FIG. 8B depicts a user interface 804 for presenting a preview 820 for a shortcut. The user interface 804 includes the preview 820 and a shortcut button 822. In one or more embodiments, the user interface 804 is presented by the messaging client 104 in response to user selection of a preview button, depicted as a thumbnail, within a list of shortcuts (e.g., per FIGS. 7A-7B.).

The preview 820 corresponds to a prior media content item (e.g., stored in the shortcuts table 318) which applies the shortcut with respect to another user. The shortcut includes applying an augmented reality content item (e.g., sunglasses overlay), as well as an audio track and timeline mode. The user interface 804 further includes a shortcut button 822, user selection of which applies the previewed shortcut with respect to a live captured image (e.g., similar to FIG. 8A).

Figure 9:
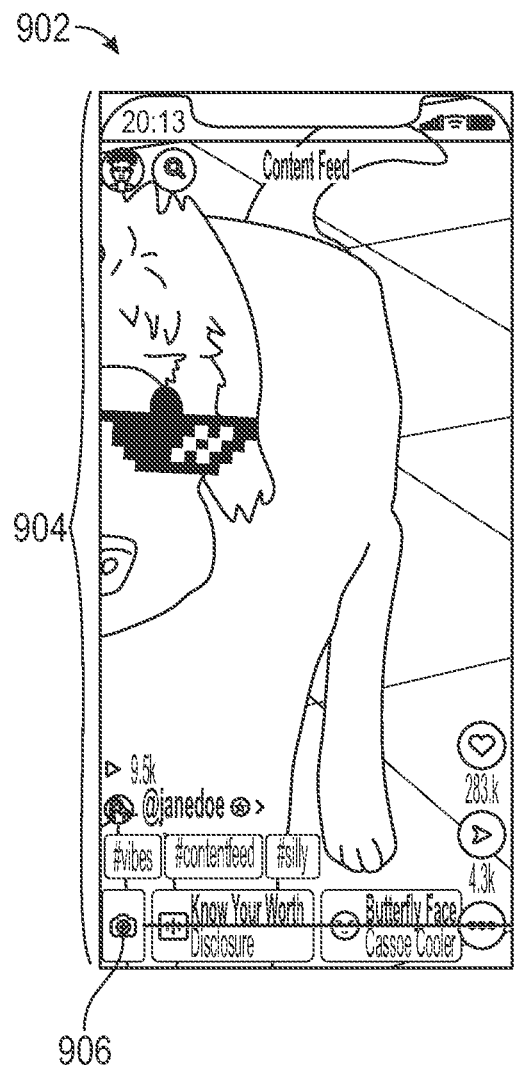
FIG. 9 illustrates an example user interface of presenting a media content item together with an icon for performing a shortcut associated with the media content item, in accordance with some example embodiments.

FIG. 9 illustrates an example user interface 902 of presenting a media content item 904 together with a shortcut icon 906 for performing a shortcut associated with the media content item, in accordance with some example embodiments. As noted above with respect to FIG. 5, the media content item 904 may be displayed in association with a content feed provided by the messaging system 100. The media content item 904 may have been broadcasted by another user, such as a friend of the end user or a publisher associated with the messaging system 100.

In the example of FIG. 9, the shortcut applies an augmented reality content item (e.g., sunglasses overlay), as well as an audio track and timeline mode. Moreover, user selection of the shortcut icon 906 causes the messaging client 104 to apply the corresponding shortcut with respect to a live captured image (e.g., similar to FIG. 8A).

Figure 10C:
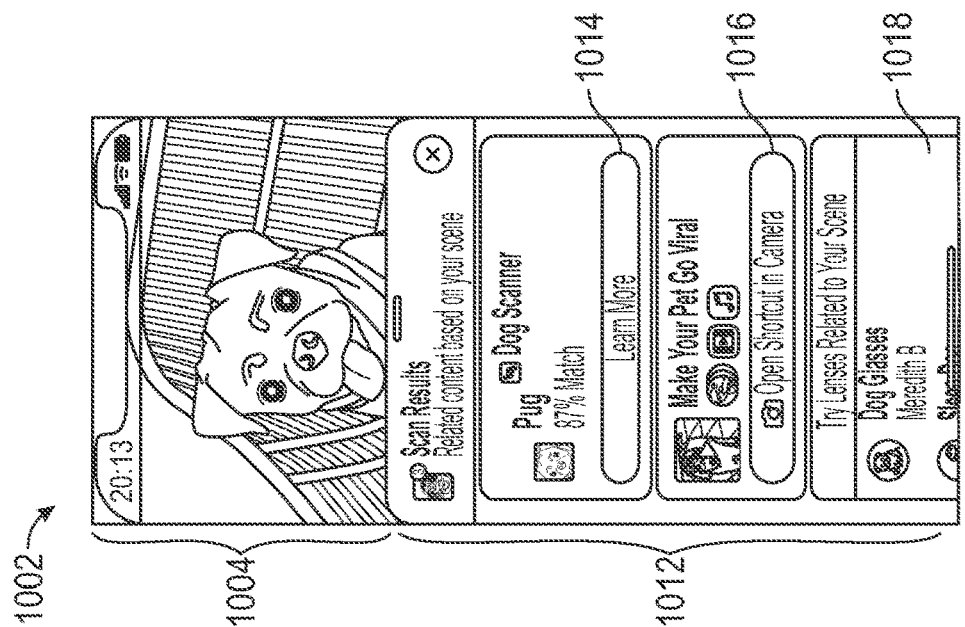
FIGS. 10A-10C illustrate an example user interface for presenting available shortcuts based on an object detected via a scan operation, in accordance with some example embodiments.
Figure 10B:
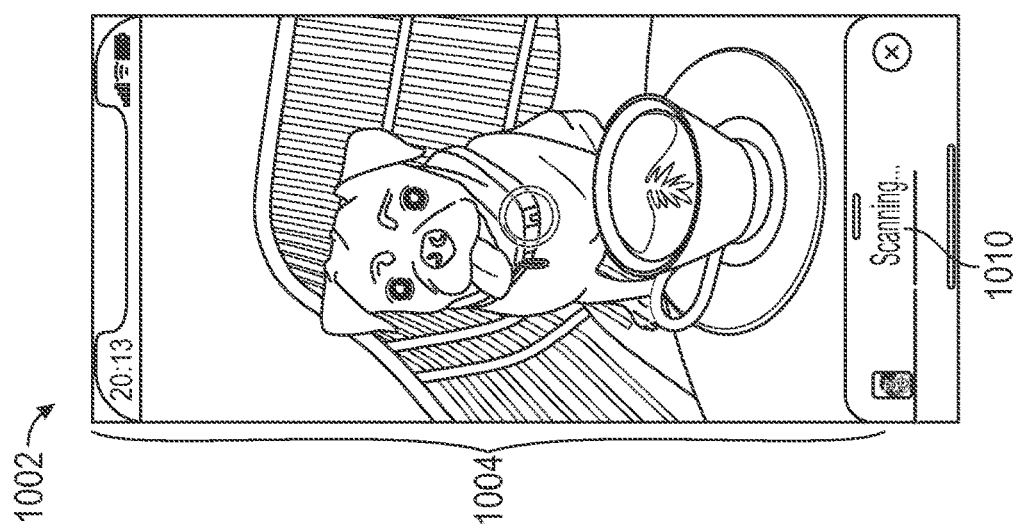
Figure 10A:
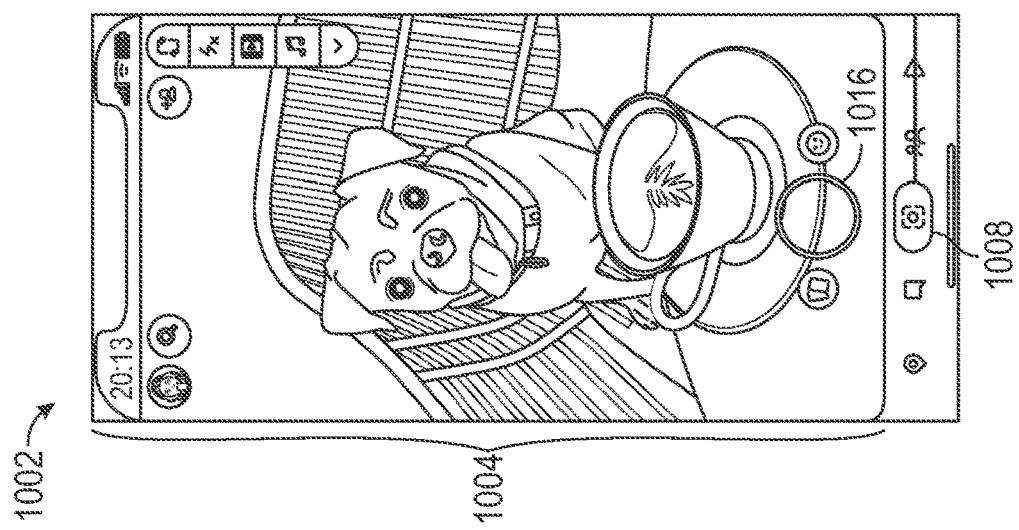

FIGS. 10A-10B illustrate an example user interface 1002 for presenting available shortcuts based on an object detected via a scan operation, in accordance with some example embodiments. For example, the user interface 1002 of FIG. 10A includes a captured image 1004, shutter button 1006 and scan button 1008.

In the example of FIG. 10A, the client device 102 captures an image (e.g., a live video feed) from a rear-facing camera of the client device 102. In this example, the captured image 1004 depicts a dog. While the example of FIG. 10A illustrates the captured image 1004 as captured by a rear-facing camera of the client device 102, it is possible for the messaging client 104 to instead capture an image (e.g., a live video feed) from a front-facing camera.

The user interface 1002 includes a shutter button 1006 for generating a media content item which includes an image (e.g., in response to a press/tap gesture of the shutter button 1006) and/or a video (e.g., in response to a press-and-hold gesture of the shutter button 1006) of the screen content, for example, to send to friends, include in a Story, and the like.

In one or more embodiments, the user of the client device 102 may provide touch input to the messaging client 104, to perform a scan operation to identify objects in the captured image 1004. For example, the touch input corresponds to a press-and-hold gesture (e.g., of at least one second) at a predefined portion of the user interface 1002 (e.g., a portion of the device screen in which the captured image 1004 is being displayed). Alternatively or in addition, the user interface 1002 includes a scan button 1008. For example, the scan button 1008 corresponds to a dedicated button for the user to perform a scan operation.

As shown in FIG. 10B, the messaging client 104 is configured to display the scanning indicator 1010 to indicate that the messaging client 104 is performing a scan operation. In one or more embodiments, the scanning indicator 1010 is displayed for the duration of the scan (e.g., a predetermined duration of 2 seconds). The scanning indicator 1010 may include an interface element (e.g., "x" icon) for terminating the scan.

During the scan operation, the messaging client 104 (e.g., in conjunction with the object detection system 212) detects objects in the captured image 1004, as well as attribute(s) of the detected objects. For example, the object detection system 210 detects attribute(s) corresponding to the dog depicted in the example of FIGS. 10A-10C. In response to determining that the attribute(s) relate to an animal (e.g., dog), the messaging client 104 (in conjunction with the shortcut system 220) is configured to select shortcut(s) associated with the attributes of the detected animal. In addition, the messaging client 104 is configured to display representations of the selected shortcuts as shown in FIG. 10C.

FIG. 10C illustrates that the user interface 1002 is updated to include a scan results interface 1012 for displaying various scan results, while continuing to display the captured image 1004. The scan results interface 1012 indicates selected shortcuts related to the attributes of the detected objects. In the example of FIG. 10C, the scan results interface 1012 indicates one selected shortcut (although it is possible for multiple shortcuts to have been selected and displayed within the scan results interface 1012). The selected shortcut is represented by displaying the name of the shortcut, a preview button (e.g., depicted as a thumbnail) for previewing the shortcut, a group of icons that respectively depict or otherwise represent the individual functions that are combined in association with the shortcut, and an interface element 1016 (the "open shortcut in camera" button) which is selectable to apply the shortcut to the captured image 1004.

Moreover, the scan results interface may include additional sections that indicate the identified objects (e.g., interface element 1014), and/or that present available augmented reality content items related to the object for applying to the captured image (e.g., interface element 1018).

Figure 11:
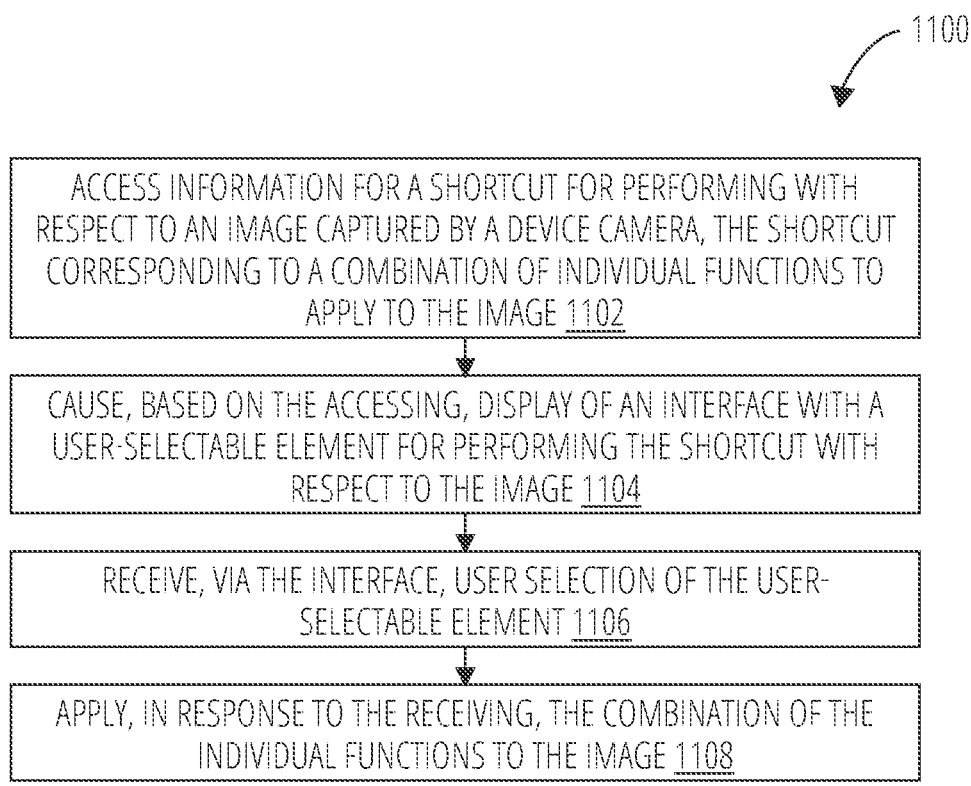
FIG. 11 is a flowchart illustrating a process for performing a shortcut, in accordance with some example embodiments.

FIG. 11 is a flowchart illustrating a process for performing a shortcut, in accordance with some example embodiments. For explanatory purposes, the process 1100 is primarily described herein with reference to the messaging client 104 of FIG. 1. However, one or more blocks (or operations) of the process 1100 may be performed by one or more other components, and/or by other suitable devices. Further for explanatory purposes, the blocks (or operations) of the process 1100 are described herein as occurring in serial, or linearly. However, multiple blocks (or operations) of the process 1100 may occur in parallel or concurrently. In addition, the blocks (or operations) of the process 1100 need not be performed in the order shown and/or one or more blocks (or operations) of the process 1100 need not be performed and/or can be replaced by other operations. The process 1100 may be terminated when its operations are completed. In addition, the process 1100 may correspond to a method, a procedure, an algorithm, etc.

The messaging client 104 accesses information for a shortcut for performing with respect to an image captured by a device camera, the shortcut corresponding to a combination of individual functions to apply to the image (block 1102). The combination of individual functions may include at least two of an augmented reality content item, a camera mode or an audio track to apply to the image.

The shortcut may be accessed from a database storing a plurality of shortcuts, each shortcut of the plurality of shortcuts corresponding to a respective combination of at least two of a respective augmented reality content item, camera mode and audio track to apply to the image. The camera mode may correspond to at least one of a timeline mode for capturing a series of video clips, a timer mode for setting when to begin video capture, and a slow-motion mode for recording video in slow motion.

The messaging client 104 causes, based on the accessing, display of an interface with a user-selectable element for performing the shortcut with respect to the image (block 1104). The interface may present a list of the plurality of shortcuts, each shortcut of the plurality of shortcuts being represented by a respective user-selectable element.

Alternatively or in addition, the interface may correspond with playback of a media content item selected from among a plurality of media content items. The user-selectable element may include an icon displayed in association with the playback of the media content item.

The messaging client 104 receives, via the interface, user selection of the user-selectable element (block 1106). The messaging client 104 applies, in response to the receiving, the combination of the individual functions to the image (block 1108). The messaging client 104 may generate a media content item based on applying the combination of the individual functions to the image.

The messaging client 104 may display, in association with the applying, a banner indicating the combination of individual functions corresponding to the shortcut and a name of the shortcut. The banner may include a second user-selectable element to stop applying the combination of individual functions to the image.

Figure 12:
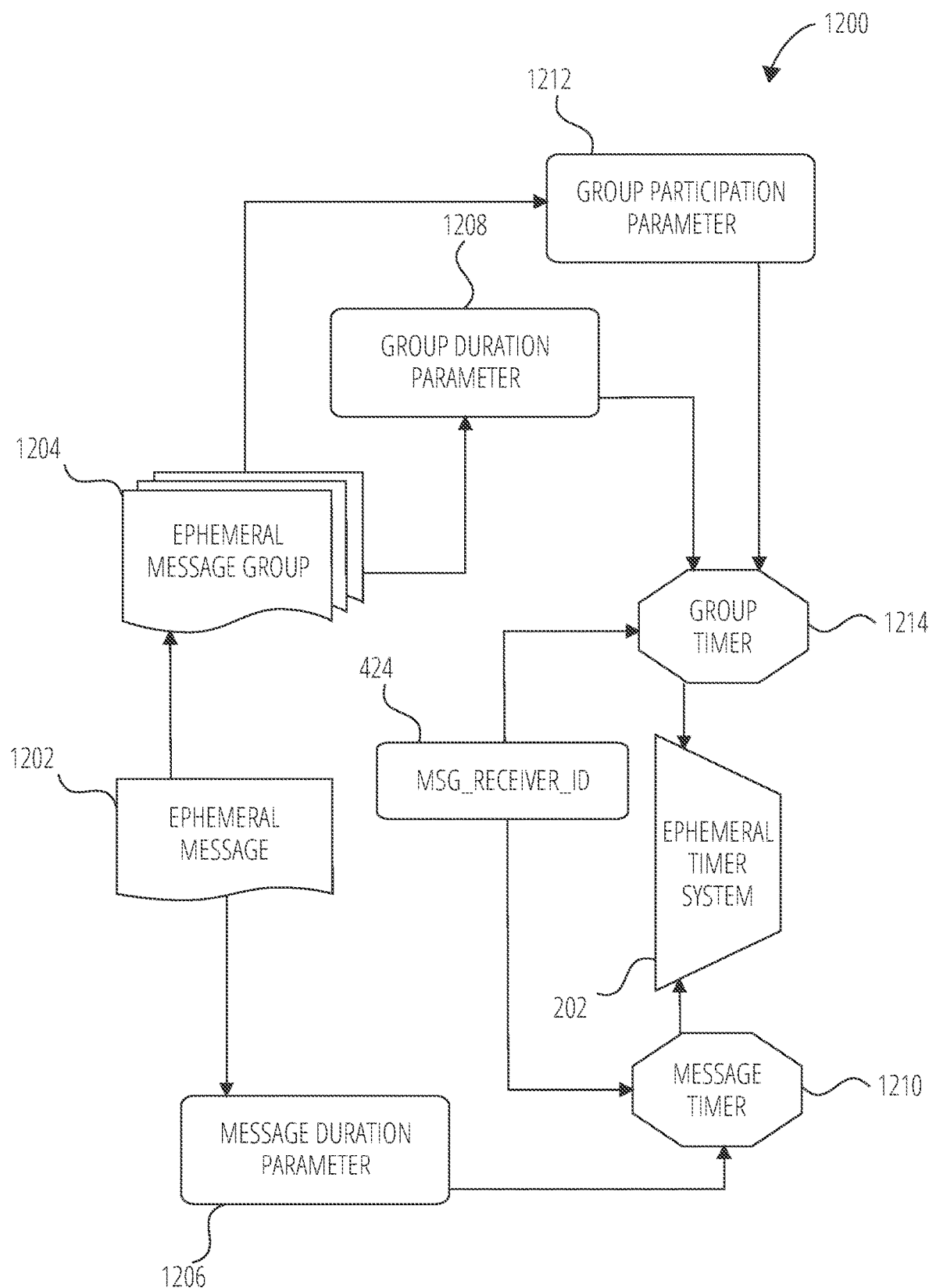
FIG. 12 is a flowchart for an access-limiting process, in accordance with some examples.

FIG. 12 is a schematic diagram illustrating an access-limiting process 1000, in terms of which access to content (e.g., an ephemeral message 1202, and associated multimedia payload of data) or a content collection (e.g., an ephemeral message group 1204) may be time-limited (e.g., made ephemeral).

An ephemeral message 1202 is shown to be associated with a message duration parameter 1206, the value of which determines an amount of time that the ephemeral message 1202 will be displayed to a receiving user of the ephemeral message 1202 by the messaging client 104. In one example, an ephemeral message 1202 is viewable by a receiving user for up to a maximum of 10 seconds, depending on the amount of time that the sending user specifies using the message duration parameter 1206.

The message duration parameter 1206 and the message receiver identifier 424 are shown to be inputs to a message timer 1210, which is responsible for determining the amount of time that the ephemeral message 1202 is shown to a particular receiving user identified by the message receiver identifier 424. In particular, the ephemeral message 1202 will only be shown to the relevant receiving user for a time period determined by the value of the message duration parameter 1206. The message timer 1210 is shown to provide output to a more generalized ephemeral timer system 202, which is responsible for the overall timing of display of content (e.g., an ephemeral message 1202) to a receiving user.

The ephemeral message 1202 is shown in FIG. 12 to be included within an ephemeral message group 1204 (e.g., a collection of messages in a personal story, or an event story). The ephemeral message group 1204 has an associated group duration parameter 1208, a value of which determines a time duration for which the ephemeral message group 1204 is presented and accessible to users of the messaging system 100. The group duration parameter 1208, for example, may be the duration of a music concert, where the ephemeral message group 1204 is a collection of content pertaining to that concert. Alternatively, a user (either the owning user or a curator user) may specify the value for the group duration parameter 1208 when performing the setup and creation of the ephemeral message group 1204.

Additionally, each ephemeral message 1202 within the ephemeral message group 1204 has an associated group participation parameter 1212, a value of which determines the duration of time for which the ephemeral message 1202 will be accessible within the context of the ephemeral message group 1204. Accordingly, a particular ephemeral message group 1204 may "expire" and become inaccessible within the context of the ephemeral message group 1204, prior to the ephemeral message group 1204 itself expiring in terms of the group duration parameter 1208. The group duration parameter 1208, group participation parameter 1212, and message receiver identifier 424 each provide input to a group timer 1214, which operationally determines, firstly, whether a particular ephemeral message 1202 of the ephemeral message group 1204 will be displayed to a particular receiving user and, if so, for how long. Note that the ephemeral message group 1204 is also aware of the identity of the particular receiving user as a result of the message receiver identifier 424.

Accordingly, the group timer 1214 operationally controls the overall lifespan of an associated ephemeral message group 1204, as well as an individual ephemeral message 1202 included in the ephemeral message group 1204. In one example, each and every ephemeral message 1202 within the ephemeral message group 1204 remains viewable and accessible for a time period specified by the group duration parameter 1208. In a further example, a certain ephemeral message 1202 may expire, within the context of ephemeral message group 1204, based on a group participation parameter 1212. Note that a message duration parameter 1206 may still determine the duration of time for which a particular ephemeral message 1202 is displayed to a receiving user, even within the context of the ephemeral message group 1204. Accordingly, the message duration parameter 1206 determines the duration of time that a particular ephemeral message 1202 is displayed to a receiving user, regardless of whether the receiving user is viewing that ephemeral message 1202 inside or outside the context of an ephemeral message group 1204.

The ephemeral timer system 202 may furthermore operationally remove a particular ephemeral message 1202 from the ephemeral message group 1204 based on a determination that it has exceeded an associated group participation parameter 1212. For example, when a sending user has established a group participation parameter 1212 of 24 hours from posting, the ephemeral timer system 202 will remove the relevant ephemeral message 1202 from the ephemeral message group 1204 after the specified 24 hours. The ephemeral timer system 202 also operates to remove an ephemeral message group 1204 when either the group participation parameter 1212 for each and every ephemeral message 1202 within the ephemeral message group 1204 has expired, or when the ephemeral message group 1204 itself has expired in terms of the group duration parameter 1208.

In certain use cases, a creator of a particular ephemeral message group 1204 may specify an indefinite group duration parameter 1208. In this case, the expiration of the group participation parameter 1212 for the last remaining ephemeral message 1202 within the ephemeral message group 1204 will determine when the ephemeral message group 1204 itself expires. In this case, a new ephemeral message 1202, added to the ephemeral message group 1204, with a new group participation parameter 1212, effectively extends the life of an ephemeral message group 1204 to equal the value of the group participation parameter 1212.

Responsive to the ephemeral timer system 202 determining that an ephemeral message group 1204 has expired (e.g., is no longer accessible), the ephemeral timer system 202 communicates with the messaging system 100 (and, for example, specifically the messaging client 104) to cause an indicium (e.g., an icon) associated with the relevant ephemeral message group 1204 to no longer be displayed within a user interface of the messaging client 104. Similarly, when the ephemeral timer system 202 determines that the message duration parameter 1206 for a particular ephemeral message 1202 has expired, the ephemeral timer system 202 causes the messaging client 104 to no longer display an indicium (e.g., an icon or textual identification) associated with the ephemeral message 1202.

Figure 13:
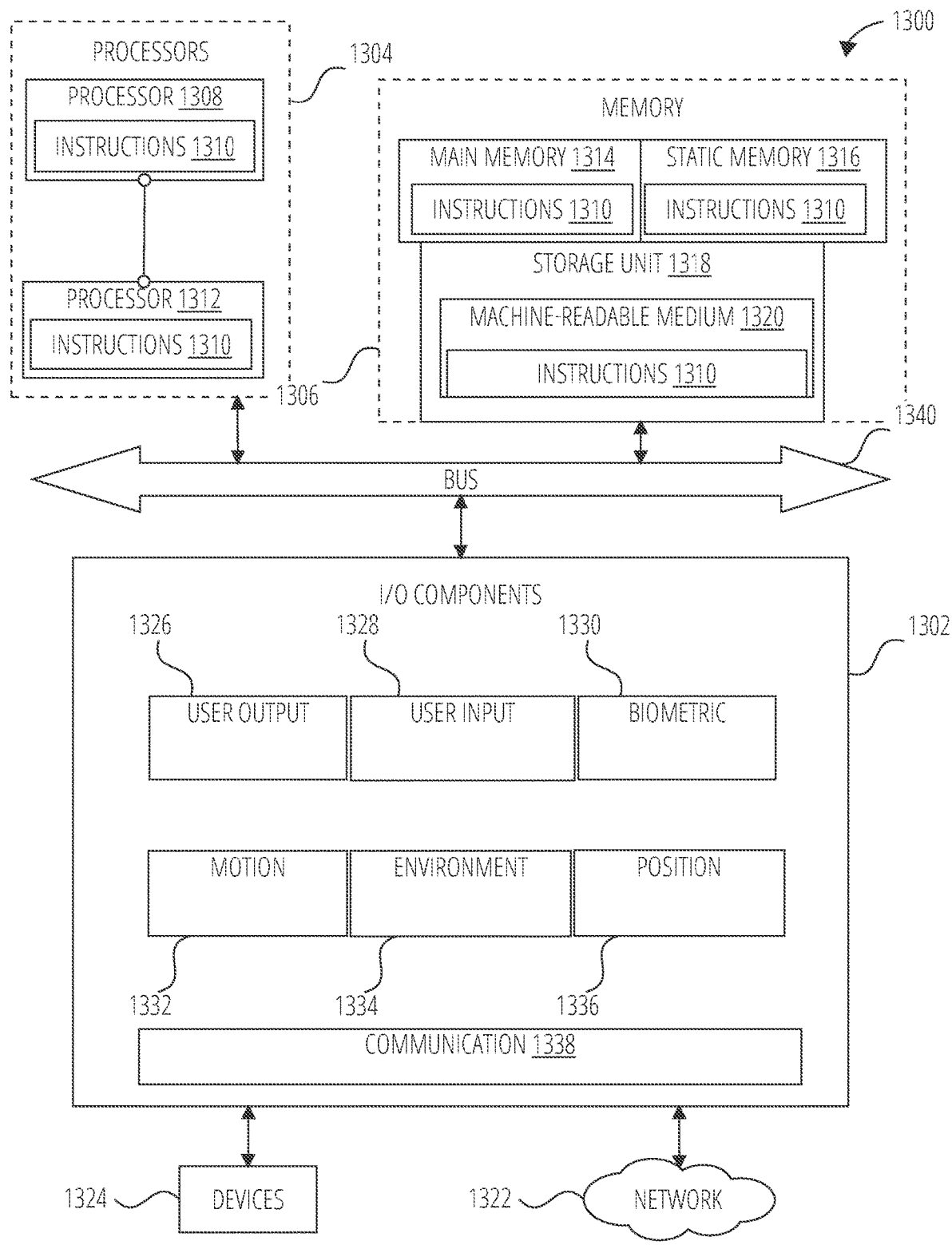
FIG. 13 is a diagrammatic representation of a machine in the form of a computer system within which a set of instructions may be executed for causing the machine to perform any one or more of the methodologies discussed herein, in accordance with some examples.

FIG. 13 is a diagrammatic representation of the machine 1300 within which instructions 1310 (e.g., software, a program, an application, an applet, an app, or other executable code) for causing the machine 1300 to perform any one or more of the methodologies discussed herein may be executed. For example, the instructions 1310 may cause the machine 1300 to execute any one or more of the methods described herein. The instructions 1310 transform the general, non-programmed machine 1300 into a particular machine 1300 programmed to carry out the described and illustrated functions in the manner described. The machine 1300 may operate as a standalone device or may be coupled (e.g., networked) to other machines. In a networked deployment, the machine 1300 may operate in the capacity of a server machine or a client machine in a server-client network environment, or as a peer machine in a peer-to-peer (or distributed) network environment. The machine 1300 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1310, sequentially or otherwise, that specify actions to be taken by the machine 1300. Further, while only a single machine 1300 is illustrated, the term "machine" shall also be taken to include a collection of machines that individually or jointly execute the instructions 1310 to perform any one or more of the methodologies discussed herein. The machine 1300, for example, may comprise the client device 102 or any one of a number of server devices forming part of the messaging server system 108. In some examples, the machine 1300 may also comprise both client and server systems, with certain operations of a particular method or algorithm being performed on the server-side and with certain operations of the particular method or algorithm being performed on the client-side.

The machine 1300 may include processors 1304, memory 1306, and input/output I/O components 1302, which may be configured to communicate with each other via a bus 1340. In an example, the processors 1304 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1308 and a processor 1312 that execute the instructions 1310. The term "processor" is intended to include multi-core processors that may comprise two or more independent processors (sometimes referred to as "cores") that may execute instructions contemporaneously. Although FIG. 13 shows multiple processors 1304, the machine 1300 may include a single processor with a single-core, a single processor with multiple cores (e.g., a multi-core processor), multiple processors with a single core, multiple processors with multiples cores, or any combination thereof.

The memory 1306 includes a main memory 1314, a static memory 1316, and a storage unit 1318, both accessible to the processors 1304 via the bus 1340. The main memory 1306, the static memory 1316, and storage unit 1318 store the instructions 1310 embodying any one or more of the methodologies or functions described herein. The instructions 1310 may also reside, completely or partially, within the main memory 1314, within the static memory 1316, within machine-readable medium 1320 within the storage unit 1318, within at least one of the processors 1304 (e.g., within the Processor's cache memory), or any suitable combination thereof, during execution thereof by the machine 1300.

The I/O components 1302 may include a wide variety of components to receive input, provide output, produce output, transmit information, exchange information, capture measurements, and so on. The specific I/O components 1302 that are included in a particular machine will depend on the type of machine. For example, portable machines such as mobile phones may include a touch input device or other such input mechanisms, while a headless server machine will likely not include such a touch input device. It will be appreciated that the I/O components 1302 may include many other components that are not shown in FIG. 13. In various examples, the I/O components 1302 may include user output components 1326 and user input components 1328. The user output components 1326 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1328 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1302 may include biometric components 1330, motion components 1332, environmental components 1334, or position components 1336, among a wide array of other components. For example, the biometric components 1330 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1332 include acceleration sensor components (e.g., accelerometer), gravitation sensor components, rotation sensor components (e.g., gyroscope).

The environmental components 1334 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 102 may have a camera system comprising, for example, front cameras on a front surface of the client device 102 and rear cameras on a rear surface of the client device 102. The front cameras may, for example, be used to capture still images and video of a user of the client device 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 102 may also include a 360° camera for capturing 360° photographs and videos.

Further, the camera system of a client device 102 may include dual rear cameras (e.g., a primary camera as well as a depth-sensing camera), or even triple, quad or penta rear camera configurations on the front and rear sides of the client device 102. These multiple cameras systems may include a wide camera, an ultra-wide camera, a telephoto camera, a macro camera and a depth sensor, for example.

The position components 1336 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1302 further include communication components 1338 operable to couple the machine 1300 to a network 1322 or devices 1324 via respective coupling or connections. For example, the communication components 1338 may include a network interface Component or another suitable device to interface with the network 1322. In further examples, the communication components 1338 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1324 may be another machine or any of a wide variety of peripheral devices (e.g., a peripheral device coupled via a USB).

Moreover, the communication components 1338 may detect identifiers or include components operable to detect identifiers. For example, the communication components 1338 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1338, such as location via Internet Protocol (IP) geolocation, location via Wi-Fi® signal triangulation, location via detecting an NFC beacon signal that may indicate a particular location, and so forth.

The various memories (e.g., main memory 1314, static memory 1316, and memory of the processors 1304) and storage unit 1318 may store one or more sets of instructions and data structures (e.g., software) embodying or used by any one or more of the methodologies or functions described herein. These instructions (e.g., the instructions 1310), when executed by processors 1304, cause various operations to implement the disclosed examples.

The instructions 1310 may be transmitted or received over the network 1322, using a transmission medium, via a network interface device (e.g., a network interface component included in the communication components 1338) and using any one of several well-known transfer protocols (e.g., hypertext transfer protocol (HTTP)). Similarly, the instructions 1310 may be transmitted or received using a transmission medium via a coupling (e.g., a peer-to-peer coupling) to the devices 1324.

Figure 14:
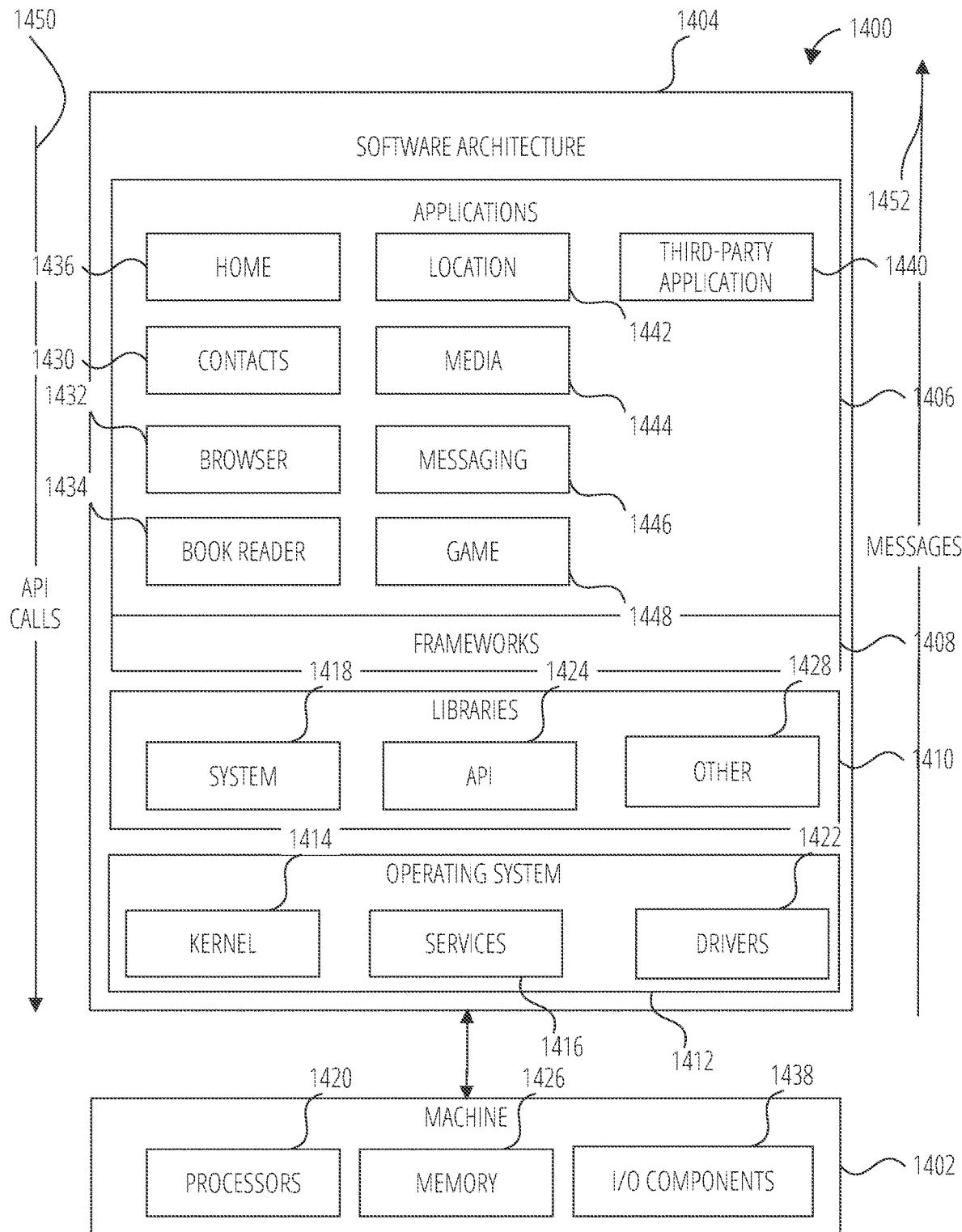
FIG. 14 is a block diagram showing a software architecture within which examples may be implemented.

FIG. 14 is a block diagram 1400 illustrating a software architecture 1404, which can be installed on any one or more of the devices described herein. The software architecture 1404 is supported by hardware such as a machine 1402 that includes processors 1420, memory 1426, and I/O components 1438. In this example, the software architecture 1404 can be conceptualized as a stack of layers, where each layer provides a particular functionality. The software architecture 1404 includes layers such as an operating system 1412, libraries 1410, frameworks 1408, and applications 1406. Operationally, the applications 1406 invoke API calls 1450 through the software stack and receive messages 1452 in response to the API calls 1450.

The operating system 1412 manages hardware resources and provides common services. The operating system 1412 includes, for example, a kernel 1414, services 1416, and drivers 1422. The kernel 1414 acts as an abstraction layer between the hardware and the other software layers. For example, the kernel 1414 provides memory management, processor management (e.g., scheduling), component management, networking, and security settings, among other functionality. The services 1416 can provide other common services for the other software layers. The drivers 1422 are responsible for controlling or interfacing with the underlying hardware. For instance, the drivers 1422 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1410 provide a common low-level infrastructure used by the applications 1406. The libraries 1410 can include system libraries 1418 (e.g., C standard library) that provide functions such as memory allocation functions, string manipulation functions, mathematic functions, and the like. In addition, the libraries 1410 can include API libraries 1424 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1410 can also include a wide variety of other libraries 1428 to provide many other APIs to the applications 1406.

The frameworks 1408 provide a common high-level infrastructure that is used by the applications 1406. For example, the frameworks 1408 provide various graphical user interface (GUI) functions, high-level resource management, and high-level location services. The frameworks 1408 can provide a broad spectrum of other APIs that can be used by the applications 1406, some of which may be specific to a particular operating system or platform.

In an example, the applications 1406 may include a home application 1436, a contacts application 1430, a browser application 1432, a book reader application 1434, a location application 1442, a media application 1444, a messaging application 1446, a game application 1448, and a broad assortment of other applications such as a third-party application 1440. The applications 1406 are programs that execute functions defined in the programs. Various programming languages can be employed to create one or more of the applications 1406, structured in a variety of manners, such as object-oriented programming languages (e.g., Objective-C, Java, or C++) or procedural programming languages (e.g., C or assembly language). In a specific example, the third-party application 1440 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1440 can invoke the API calls 1450 provided by the operating system 1412 to facilitate functionality described herein.

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A method, comprising:
accessing information for a shortcut for performing with respect to an image captured by a device camera, the shortcut corresponding to a combination of individual functions to apply to the image;
causing, based on the accessing, display of an interface with a user-selectable element for performing the shortcut with respect to the image;
receiving, via the interface, user selection of the user-selectable element; and
applying, in response to the receiving, the combination of the individual functions to the image,
wherein the combination of individual functions comprises at least two of an augmented reality content item, a camera mode or an audio track to apply to the image, and
wherein the camera mode corresponds to at least one of a timeline mode for capturing a series of video clips, a timer mode for setting when to begin video capture, and a slow-motion mode for recording video in slow motion.

2. The method of claim 1, wherein the shortcut is accessed from a database storing a plurality of shortcuts, each shortcut of the plurality of shortcuts corresponding to a respective combination of at least two of a respective augmented reality content item, camera mode and audio track to apply to the image.

3. The method of claim 2, wherein the interface presents a list of the plurality of shortcuts, each shortcut of the plurality of shortcuts being represented by a respective user-selectable element.

4. The method of claim 1, further comprising:
generating a media content item based on applying the combination of the individual functions to the image.

5. The method of claim 1, wherein the interface corresponds with playback of a media content item selected from among a plurality of media content items.

6. The method of claim 5, wherein the user-selectable element comprises an icon displayed in association with the playback of the media content item.

7. A method, comprising:
accessing information for a shortcut for performing with respect to an image captured by a device camera, the shortcut corresponding to a combination of individual functions to apply to the image;
causing, based on the accessing, display of an interface with a user-selectable element for performing the shortcut with respect to the image;
receiving, via the interface, user selection of the user-selectable element;
applying, in response to the receiving, the combination of the individual functions to the image; and
displaying, in association with the applying, a banner indicating the combination of individual functions corresponding to the shortcut and a name of the shortcut,
wherein the banner includes a second user-selectable element to stop applying the combination of individual functions to the image.

8. A system comprising:
a processor; and
a memory storing instructions that, when executed by the processor, configure the processor to perform operations comprising:
accessing information for a shortcut for performing with respect to an image captured by a device camera, the shortcut corresponding to a combination of individual functions to apply to the image;
causing, based on the accessing, display of an interface with a user-selectable element for performing the shortcut with respect to the image;
receiving, via the interface, user selection of the user-selectable element; and
applying, in response to the receiving, the combination of the individual functions to the image,
wherein the combination of individual functions comprises at least two of an augmented reality content item, a camera mode or an audio track to apply to the image, and
wherein the camera mode corresponds to at least one of a timeline mode for capturing a series of video clips, a timer mode for setting when to begin video capture, and a slow-motion mode for recording video in slow motion.

9. The system of claim 8, wherein the shortcut is accessed from a database storing a plurality of shortcuts, each shortcut of the plurality of shortcuts corresponding to a respective combination of at least two of a respective augmented reality content item, camera mode and audio track to apply to the image.

10. The system of claim 9, wherein the interface presents a list of the plurality of shortcuts, each shortcut of the plurality of shortcuts being represented by a respective user-selectable element.

11. The system of claim 8, the operations further comprising:
generating a media content item based on applying the combination of the individual functions to the image.

12. The system of claim 8, wherein the interface corresponds with playback of a media content item selected from among a plurality of media content items.

13. The system of claim 12, wherein the user-selectable element comprises an icon displayed in association with the playback of the media content item.

14. A system comprising:
a processor; and
a memory storing instructions that, when executed by the processor, configure the processor to perform operations comprising:
accessing information for a shortcut for performing with respect to an image captured by a device camera, the shortcut corresponding to a combination of individual functions to apply to the image;

causing, based on the accessing, display of an interface with a user-selectable element for performing the shortcut with respect to the image;
receiving, via the interface, user selection of the user-selectable element;
applying, in response to the receiving, the combination of the individual functions to the image; and
displaying, in association with the applying, a banner indicating the combination of individual functions corresponding to the shortcut and a name of the shortcut, wherein the banner includes a second user-selectable element to stop applying the combination of individual functions to the image.

15. A non-transitory computer-readable storage medium, the computer-readable storage medium including instructions that when executed by a computer, cause the computer to perform operations comprising:

accessing information for a shortcut for performing with respect to an image captured by a device camera, the shortcut corresponding to a combination of individual functions to apply to the image;
causing, based on the accessing, display of an interface with a user-selectable element for performing the shortcut with respect to the image;
receiving, via the interface, user selection of the user-selectable element; and
applying, in response to the receiving, the combination of the individual functions to the image,
wherein the combination of individual functions comprises at least two of an augmented reality content item, a camera mode or an audio track to apply to the image,
wherein the camera mode corresponds to at least one of a timeline mode for capturing a series of video clips, a timer mode for setting when to begin video capture, and a slow-motion mode for recording video in slow motion.

* * * * *